US012749977B2

(12) United States Patent
Bertolini et al.

(10) Patent No.: US 12,749,977 B2

(45) Date of Patent: Sep. 29, 2026

(54) METHOD FOR CONTROLLING A NON-INVERTING BUCK BOOST DC-DC CONVERTER AND CORRESPONDING CONVERTER

(71) Applicant: STMicroelectronics International N.V., Geneva (CH)

(72) Inventors: Alessandro Bertolini, Vermiglio (IT); Alessandro Gasparini, Cusano Milanino (IT)

(73) Assignee: STMicroelectronics International N.V., Geneva (CH)

(*) Notice: Subject to any disclaimer, the term of this patent is extended or adjusted under 35 U.S.C. 154(b) by 98 days.

(21) Appl. No.: 18/904,313

(22) Filed: Oct. 2, 2024

(65) Prior Publication Data

US 2025/0112556 A1 Apr. 3, 2025

(30) Foreign Application Priority Data

Oct. 3, 2023 (IT) ........................ 102023000020445

(51) Int. Cl.

*H02M 3/158* (2006.01)
*H02M 1/00* (2007.01)
*H02M 1/14* (2006.01)

(52) U.S. Cl.

CPC ....... *H02M 3/1582* (2013.01); *H02M 1/0009* (2021.05); *H02M 1/0025* (2021.05); *H02M 1/14* (2013.01)

(58) Field of Classification Search

None
See application file for complete search history.

(56) References Cited

U.S. PATENT DOCUMENTS

2008/0055946 A1* 3/2008 Lesso
2017/0257031 A1 9/2017 Shao et al.
2020/0373841 A1 11/2020 Xie et al.
(Continued)

FOREIGN PATENT DOCUMENTS

CN 110311558 A 10/2019
CN 112865532 A 5/2021
EP 4243261 A1 9/2023

OTHER PUBLICATIONS

IT Search Report and Written Opinion for priority application, IT Appl. No. 102023000020445, report dated Apr. 2, 2024, 10 pgs.

*Primary Examiner* — Crystal L Hammond
*Assistant Examiner* — Seung Ho Choi
(74) *Attorney, Agent, or Firm* — Crowe & Dunlevy LLC

(57) ABSTRACT

A non-inverting buck boost DC-DC converter operates with a ripple-hysteretic-current-mode-control including: a first state where control signals close a first high side switch and a second low side switch; a second state where control signals close the first high side switch and a second high side switch; a third state where control signals close a first low side switch and the second high side switch; and a fourth state where control signals close the first low side switch and the second low side switch. Control signal peak voltage and valley voltage are detected. Passing between the first, second, third and fourth states is dependent on peak voltage detection, valley voltage detection, expiration of a variable first time interval following entering the second state, and expiration of a fixed second time interval following entering the third state.

17 Claims, 15 Drawing Sheets

(56) References Cited

U.S. PATENT DOCUMENTS

| | | | |
|---|---|---|---|
| 2021/0091670 | A1 | 3/2021 | Bayer et al. |
| 2022/0247313 | A1 | 8/2022 | Song et al. |
| 2023/0091808 | A1 | 3/2023 | Philbrick et al. |

* cited by examiner

METHOD FOR CONTROLLING A NON-INVERTING BUCK BOOST DC-DC CONVERTER AND CORRESPONDING CONVERTER

PRIORITY CLAIM

This application claims the priority benefit of Italian Application for Patent No. 102023000020445, filed on Oct. 3, 2023, the content of which is hereby incorporated by reference in its entirety to the maximum extent allowable by law.

TECHNICAL FIELD

The description relates to a method for controlling a non-inverting buck boost DC-DC converter comprising a first input half bridge coupled to an end of an inductive coil and a second output half bridge coupled to the other end of said inductive coil comprising a high side switch. The first input half bridge comprises a first high side switch coupled between an input node and said end of the inductive coil and a first low side switch coupled between said end of the inductive coil and ground. The second input half bridge comprises a second high side switch coupled between an output node and said other end of the inductive coil and a second low side switch coupled between said end of the inductive coil and ground. The control method comprises performing a ripple-hysteretic-current-mode-control on said DC-DC converter by providing a control voltage as error between a feedback signal from said output of said converter and a reference signal obtaining from said control voltage a control signal applied to switches of said converter.

One or more embodiments may be applied to converters used in AMOLED applications.

BACKGROUND

DC-DC converters are currently deeply used in a great variety of applications, to generate appropriate supply voltage rails required by complex systems to work and to guarantee requested performances. Many of such systems have a particular focus on both efficiency and performance. In many applications a large flexibility is requested to the converter, with the needs of many operating modes.

A non-inverting buck-boost (NIBB) converter is a switched-inductor topology of DC-DC converter that allows to regulate the output voltage (e.g., $V_{OUT}$) either above or below respect to the input voltage (e. g., $V_{IN}$).

FIG. 1 shows, for instance, an exemplary embodiment of a NIBB converter 10, which comprises an input node IN to which is brought an input voltage VIN, an inductor L, i.e., an inductive coil, which is coupled, at a first inductor terminal LX1, to the input node IN by a first half bridge HB1 comprising a high side switch HS1 coupled between the input voltage VIN and the first inductor terminal LX1, and a low side switch LS1, coupled between the first inductor terminal LX1 and ground GND. In the same way a second inductor terminal LX2 is coupled to an output node on which is formed an output voltage VOUT of the NIBB converter 10, by a second half bridge HB2 comprising a high side switch HS2 coupled between the output voltage VOUT and the second inductor terminal LX2, and a low side switch LS2, coupled between the second inductor terminal LX2 and ground GND. Thus, the NIBB converter 10 comprises two half-bridges, with four switches in total and it can be seen as a cascade of two DC-DC converters, respectively a buck and a boost, sharing a common coil, i.e., inductor L.

In consumer applications, miniaturization is very important, demanding for small external passive components, especially in terms of thickness. A high-efficiency is mandatory in every condition of input voltage $V_{IN}$ and output voltage $V_{OUT}$, and especially at high-load for thermal budget limits. To satisfy such needs, the DC-DC converter should perform maintaining a low coil current, allowing to reduce the silicon area (i.e., small power switches) as well as find suitable inductors.

In AMOLED applications, the NIBB converter is fed by a battery normally providing an input voltage $V_{IN}$ from 2.2V to 5V. Here, the desired regulated output voltage is typically selectable from 1.8V to 5.2V and represents the positive display panel voltage rail. The requested performances of the converters are challenging and highly demanding, in fact any ripple and transient on the positive regulated supply directly translates into display flickering, therefore impacting the final user experience and the whole display quality. For this reason, the converter is typically requested to operate in continuous-conduction-mode (CCM) as the preferred operating mode.

FIG. 2 shows a diagram which reports the conversion ratio $M=V_{OUT}/V_{IN}$ of a standard NIBB converter such as the one shown in FIG. 1, varying the duty-cycle, D, of the PWM signal driving the switches in their open and close state.

In general, for any DC-DC converter, the ratio between coil current ($I_{COIL}$) and output load current ($I_{LOAD}$) is a good index that allows also to understand how much the DC-DC converter needs to "work" and accumulate within the coil to guarantee the output regulation: the lower such ratio the better, meaning that the DC-DC converter effort is reduced and efficiency increases.

Among the different control methods which can be applied to a NIBB converter, a particular current-mode-control is now described: the ripple-hysteretic-current-mode-control.

FIG. 3A shows a schematic of a control circuit 50, configured to perform ripple-hysteretic-current-mode-control on a DC-DC converter such as the one shown in FIG. 1, while FIG. 3B shows a time diagram of a control voltage $v_c(t)$ issued by said control circuit 50.

As shown in FIG. 3A, a control voltage $v_c(t)$ is provided by an error amplifier (i.e., compensator, not shown), and is then processed to obtain two symmetrically shifted versions: a peak voltage $v_{c\_p}(t)$ and a valley voltage $v_{c\_v}(t)$. In particular, the peak voltage $v_{c\_c}$ is obtained summing, in a summation block 51, a given voltage offset $\Delta V_c$, while the valley voltage $v_{c\_v}$ is obtained subtracting the same voltage offset $\Delta V_c$ by a respective subtraction block 52. Such peak voltage $v_{c\_p}(t)$ and valley voltage $v_{c\_v}(t)$ are compared with a sense voltage $v_{sense}(t)$, which is a voltage proportional to a current $I_{COIL}$ flowing within the coil L: $V_{sense}=GI_{COIL}$. Two hysteretic comparators 53 and 54 are exploited to compare the sense voltage $v_{sense}$ with respectively the peak voltage $v_{c\_p}(t)$ and valley voltage $v_{c\_v}(t)$, supplying the output of the comparators 53, 54 to a set S and reset R input of a S-R flip flop 55, which outputs a control action or command c(t) (supplied at an output Q of the S-R flip flop 55) for the main (i.e., active) switch of a generic DC-DC converter (e.g., the high-side in a buck DC-DC converter, the low-side in a boost DC-Dc converter). When such main switch is operated, the coil current $I_{COIL}$ increases and so does the sense voltage $V_{sense}$, when Vsense=$V_{c\_p}$, i.e., the peak control voltage, the output Q, i.e., the control action c(t) is reset, turning off the main switch of the DC-DC converter. The coil current $I_{COIL}$ decreases and so does the sense voltage $V_{sense}$; when Vsense=$V_{c\_v}$, i.e., the valley control voltage, the control action c(t) is set again, turning on the main switch of the DC-DC converter 10 and a new switching cycle begins. Basically, the controller regulates the average coil current, in fact—in steady state—the control voltage $v_c(t)$ provided by the error amplifier is a scaled version of the average coil current (with the scaling factor given by a proportionality factor G, between the coil current $I_{COIL}$ and the sense voltage $V_{SENSE}$).

The advantages of such control algorithm are an inherent current limitation, the need of a simple compensator composed of a type-II network instead of a more complex type-III and the fast reaction to any transient thanks to the inherent non-linear response. By selecting the value of the offset voltage $\Delta V_c$, the coil ripple current is fixed, since $\Delta I_{COIL}=2\Delta V_c/G$, and the DC-DC converter performs with a corresponding switching frequency. For this reason, the converter switching frequency is dependent on the operating conditions $V_{IN}$, $V_{OUT}$ and L, being the coil current up/down slopes mainly dependent on such parameters. Another advantage of this control method is that it does not need any slope compensation ramp, otherwise required in fixed frequency current-mode controls.

In a NIBB converter, how the four switches are operated is important for the final DC-DC converter efficiency; different modes have been used and studied.

A solution is given by the four-phases trapezoidal current. In this case, the NIBB converter 10, shown again in FIG. 4A, is operated in a single-mode, with a coil current $I_{COIL}(t)$ composed of 4-phases, P1, P2, P3, P4 succeeding one after the other in time t, forming a trapezoid, as illustrated in the diagram of FIG. 4B. The additional fourth phase P4 is introduced to allow the management of a minimum on-time of the second low side switch LS2 and of a minimum off-time of the first high side switch HS1, actually extending them; indeed, the table shown in FIG. 4C, which indicates which switch HS1, HS2, LS1, LS2 is operated according to the phase P1, P2, P3, P4, shows that between each phase only a single switch is changed, allowing to have each switch operated for two consecutive phases. FIG. 4A shows on the converter 10 the current paths associated to the four phases P1, P2, P3, P4.

The additional maintaining phase P4 is lossy by definition and should be minimized, otherwise impacting the efficiency and increasing the required coil current. In addition, when the input voltage $V_{IN}$ is far in value from the output voltage $V_{OUT}$, always performing with all the 4-phases is inefficient and poses many difficulties. In AMOLED applications, there may be two main problems. First, the required power switches may be impractically feasible, not only to meet efficiency specifications, but for thermal issues as well. Second, it is very difficult to find suitable low-profile inductors, supporting such high currents (i.e., saturation current as well as current rating) and in the meanwhile exhibiting low DCR, i.e., DC resistance, (to meet efficiency specifications).

There is a need in the art to contribute in dealing with a number of issues which are recognized to exist in a context as discussed in the foregoing.

SUMMARY

One or more embodiments may relate to a method.

One or more embodiments may relate to a corresponding converter.

In embodiments the solution here described refers to a method for controlling a non-inverting buck boost DC-DC converter that includes a first input half bridge coupled to an end of an inductive coil and a second output half bridge coupled to the other end of said inductive coil, said first input half bridge comprising a first high side switch coupled between an input node and said end of the inductive coil and a first low side switch coupled between said end of the inductive coil and ground, said second input half bridge comprising a second high side switch coupled between an output node and said other end of the inductive coil and a second low side switch coupled between said other end of the inductive coil and ground.

The method comprises performing a ripple-hysteretic-current-mode-control on said non-inverting buck boost DC-DC converter comprising providing a control voltage based on an error between a feedback signal from said output of said non-inverting buck boost DC-DC converter and a reference signal; and performing at least a first comparison and a second comparison of said control voltage with a reference signal, proportional to a current flowing in said coil, adding and respectively subtracting an offset voltage in the respective comparison operation, to obtain control signals applied to one or more of said switches of said converter to drive their opening and closing state.

The method further comprises operating control among a plurality of states of operation comprising: a first state in which said control signals determine the first high side switch and the second low side switch to be closed; a second state in which said control signals determine the first high side switch and the second high side switch to be closed; a third state in which said control signals determine the first low side switch and the second high side switch to be closed; and a fourth state in which said control signals determine the first low side switch and the second low side switch to be closed.

The method still further comprises performing said at least a first comparison and a second comparison detecting respectively reaching a peak voltage and a valley voltage, and said operating control comprises: passing from the first state to the second state when it is detected reaching said peak voltage; passing from the second state to the first state when said control voltage is detected reaching said valley voltage; passing from the second state to the third state upon detection of the expiration of a variable first time interval, measured from the entering in said second state, which length varies as a function of a set of detection parameters and decreases with the increasing of said input voltage, said control voltage being detected as having not reached said valley voltage; passing from the third state to the fourth state when said control voltage is detected reaching said valley voltage and a second time interval having a fixed length and measured from the entering in said third state is not expired; passing from the third state to the first state if the second time duration is expired and the valley voltage is reached; and passing from the fourth state to the first state if the second time duration is expired.

In embodiments, said length of the first time interval also decreases as a function of a difference between the input voltage and the output voltage.

In embodiments, said converter is configured to operate in buck boost mode if the input voltage is close to the output voltage within a determined voltage range, in a step up mode if the input voltage is lower than the output voltage outside said range, and in step down mode if the input voltage is greater than the output voltage outside said range, regulating the passage among said three modes of operation, by selecting the values of the set of detection parameters and the fixed length of the second time interval.

In embodiments, said step up mode comprises, in a switching cycle of the control signals passing from the first state to the second state when said control voltage reaches said peak voltage, passing from the second state to the first state when said control voltage reaches said valley voltage.

In embodiments, said buck boost mode comprises, in a switching cycle of the control signal: passing from the first state to the second state when said control voltage reaches said peak voltage; passing from the second state to the third state upon expiry of a first determined time length, said control voltage being detected as having not reached said valley voltage; passing from the third state to the fourth state when said control voltage is detected reaching said valley voltage and a second time interval having a fixed length is not expired; and passing from the fourth state to the first state if the second determined time length is expired.

In embodiments, said step down mode comprises, in a switching cycle of the control signal passing from the first state to the second state when said control voltage reaches said peak voltage: passing from the second state to the third state upon expiry of a first determined time length, said control voltage being detected as having not reached said valley voltage; and passing from the third state to the first state if the second determined time length is expired and the valley voltage is reached.

In embodiments, a startup procedure of said converter comprises: providing a fixed frequency startup clock to the converter; at start bringing the converter in a first startup state, in which only the first high side switch is asserted, which lasts until said coil current reaches a peak, signaled by the assertion of a corresponding peak signal, then a transition to a second state is performed in which a coil discharge is performed, in particular by asserting only the first low side switch, at the following startup clock rising edge either going to the first state, if the output voltage has not reached a given minimum value or to a third state in which said ripple-hysteretic-current-mode-control is performed.

In embodiments, said operating control comprises, with respect to said detection of the expiration of a variable first time interval, measured from the entering in said second state and detection of the expiration of a fixed second time interval, measured from the entering in said third state, a sending of respective signals starting said measuring.

The solution refers also to embodiments of a control circuit of a non-inverting buck boost DC-DC converter configured to perform a ripple-hysteretic-current-mode-control.

In embodiments, said control circuit comprises a circuit configured to compare said control voltage to a sense voltage to detect when it reaches a peak value or a valley value, asserting a corresponding peak flag or valley flag, and it comprises a first circuit configured to detect the expiration of said determined time length proportional to the difference between the input voltage and the output voltage asserting a corresponding buck timer flag, and a second circuit configured to detect the expiration of said second determined time length asserting a corresponding minimum timer flag.

In embodiments, said circuit configured to compare said control voltage is configured to compare said control voltage in a comparator with a shifted sense voltage obtained by applying to a shift resistance a voltage proportional to a current flowing in said coil and injecting in a node of the shift resistance coupled to an input of the comparator a fixed current, an up current proportional to the difference of the output voltage to the input voltage, a down current proportional to the opposite of said difference of the output voltage to the input voltage, in particular comparing in a first comparator applying said shifted sense voltage to the positive input to obtain said peak flag and in a second comparator to the negative input to obtain said valley flag.

In embodiments, said control circuit comprises a timer circuit configured to detect said first time interval, comprising a capacitor which is charged by a current proportional by a first proportionality factor to the input voltage, and in particular, by a current proportional, by a second proportionality factor to the difference of the input voltage to the output voltage, a voltage drop on said capacitor being compared by a comparator to a reference time voltage to obtain said timer buck flag value, said set of detection parameter comprising the value of said capacitor, said reference time voltage, said first proportionality factor, and in particular also said second proportionality factor.

In embodiments, said circuit comprises a timer circuit to detect said second time interval, comprising a respective capacitor which is charged by a given fixed current, a voltage drop on said capacitor being compared by a comparator to a respective time reference voltage to obtain said minimum time flag value.

In embodiments, said circuit is configured to send said respective signals starting said measuring to switches enabling said charging of the capacitor.

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

The solution here proposed is based on the observation of the four-phase trapezoidal coil current operation described above, compared to the desired/ideal NIBB converter.

When the input voltage $V_{IN}$ is much lower than the output voltage $V_{OUT}$, the coil current becomes huge, this representing a major problem: in this case, ideally the NIBB converter should operate as a classic boost DC-DC, which is usually the best, operating only the second half bridge, i.e., switches HS2, LS2, leaving the first low side switch LS1 off and first high side switch HS1 always on. Then, the additional fourth phase is not always needed, only when the voltages $V_{IN}$ and $V_{OUT}$ are close. In fact, only in this condition the minimum second low side switch LS2 on-time duration and first low side switch LS1 on-time duration are critical and if not properly managed lead the converter to naturally skip some cycles (the first half bridge or the second or both), resulting in an undesired higher output voltage ripple. In all the other conditions, such additional phase should be ideally avoided, to improve efficiency and reduce the coil current. Finally, given the strict requirements on fast line-transients in AMOLED applications, it is necessary to tailor a fast control loop able to maximize the converter bandwidth and exploit non-linearities to enhance any transient response.

Figure 5:
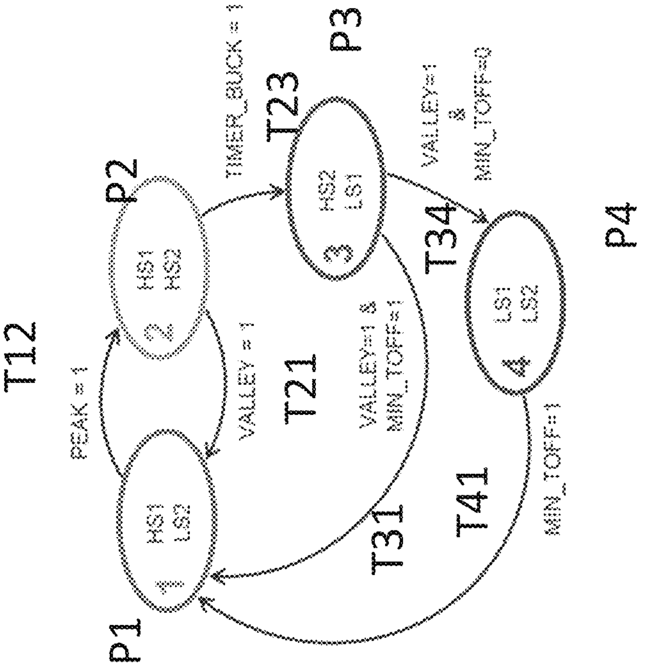
FIG. 5 is schematical representation of a state diagram schematizing a method.

FIG. 5 shows a state diagram schematizing an embodiment of the proposed method for controlling a non-inverting buck boost DC-DC converter.

In each switching cycle of the control signal, e.g., c(t) as indicated above, their sequence depends on different events, comprising:

- detecting a given coil current peak value (defined by the compensator or error amplifier, by means of the control voltage $V_c$). In that case a peak flag signal PEAK is asserted, e.g., set to 1, for instance in the RHCP circuit 60 of FIG. 10;
- detecting a given coil current valley value (defined by the compensator, by means of the control voltage $V_c$). In that case a valley flag signal VALLEY is asserted, e.g., set to 1 for instance in the RHCP circuit 60 of FIG. 10;
- detecting a time-out on a first buck timer, (e.g., 70 in FIG. 12) asserting a buck time flag TIMER_BUCK, e.g., to 1, when the time corresponding to a first determined time duration is reached; and
- detecting a time-out of a second, fixed minimum timer (e.g., 80 in FIG. 13) asserting a fixed minimum time flag signal MIN_TOFF, e.g., setting it to 1, when the time corresponding to a second determined time duration is reached.

Figure 4C:
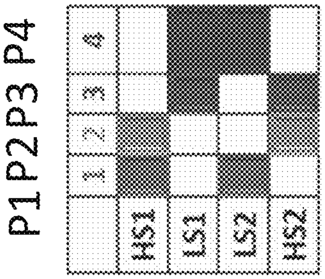
Figure 4B:
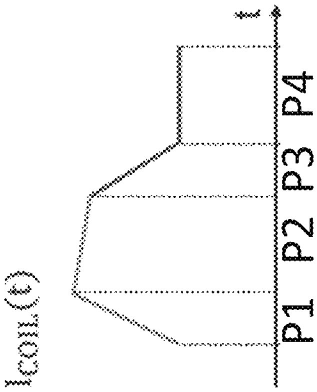
Figure 4A:
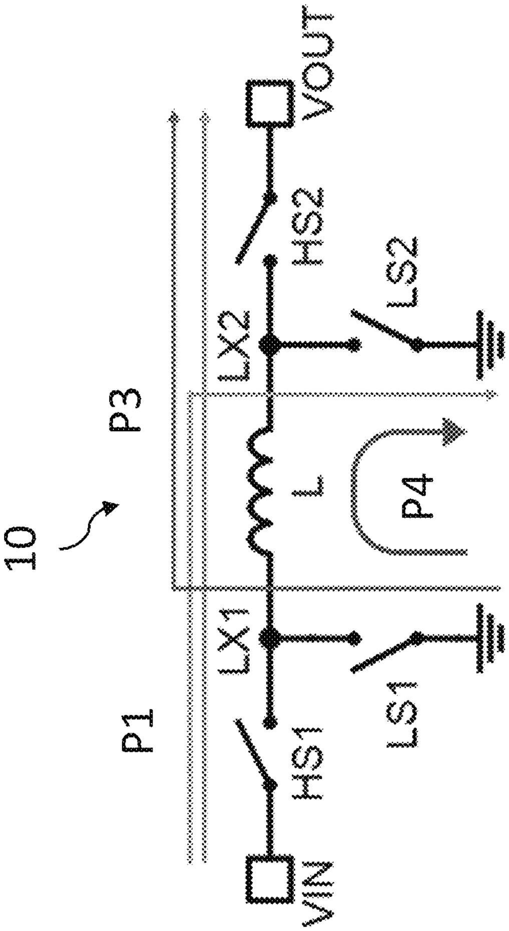
Figure 6A:
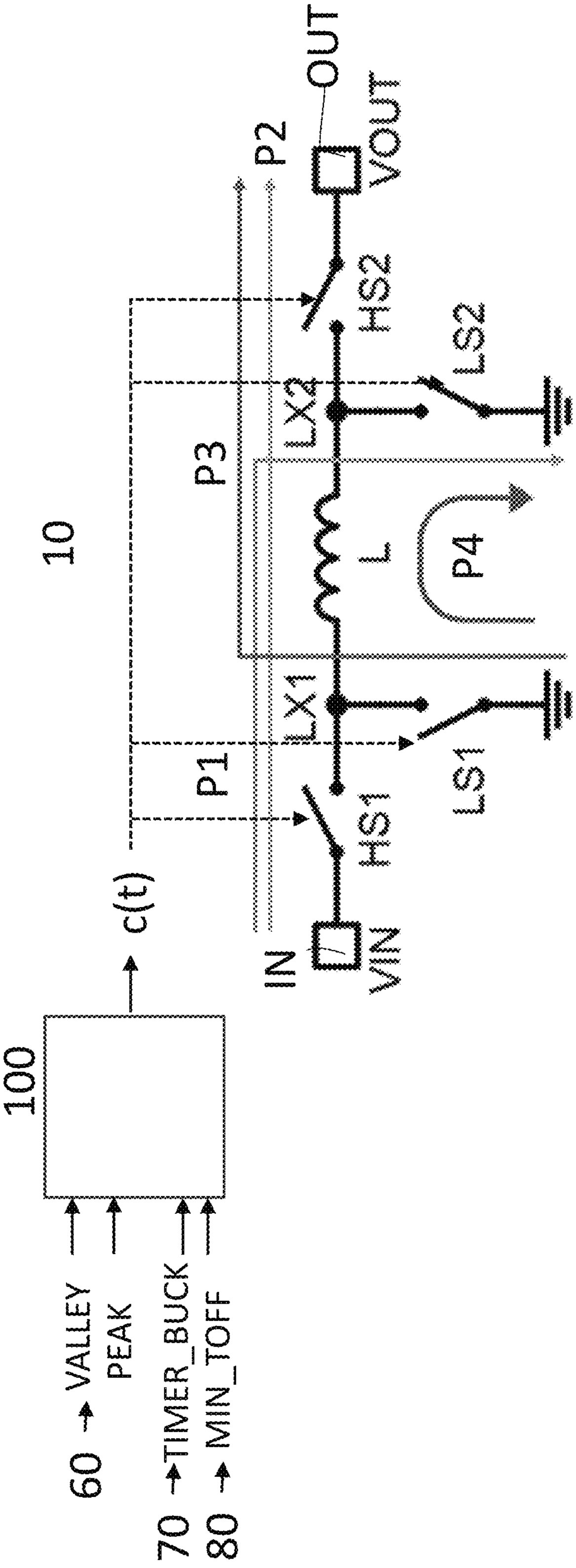
FIGS. 6A and 6B show respectively a circuit diagram of a converter controlled by the method and a table of states of switches of the converter according to said control method.
Figure 6B:
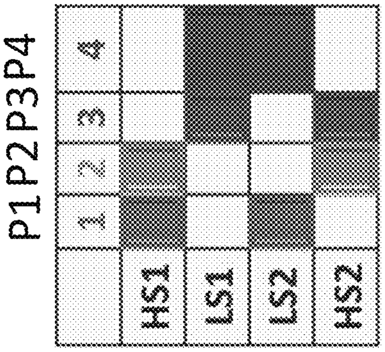

FIG. 6B indicates phases P1, P2, P3, P4 corresponding to the phases of FIG. 4B, along with their paths. FIG. 6A shows the control signal c(t) which controls each of the switches HS1, LS1, HS2, LS2 in their opening and closing states, according to the phases of FIG. 4B. Of course, the control signal c(t) corresponds thus to four commands, one for each switch to be controlled according to the phases of FIG. 4B.

According to the state diagram of FIG. 5, a transition T12 from phase, or state, P1 to phase, or state, P2 is performed if the peak flag PEAK=1, while a reverse transition from phase P2 to phase P1 is performed if the valley flag VALLEY=1. If, when in phase P2, the buck time flag TIMER_BUCK is 1, i.e., asserted, because the associated first determined time duration is reached or has expired, then a transition T23 to phase P3 is performed. From phase P3, a transition T31 from phase P3 to phase P1 is performed if the valley flag VALLEY=1 and the minimum time flag MIN_TOFF=1, i.e., asserted, because the associated second determined time duration is reached or has expired. A transition T34 from phase P3 to phase P4 is performed if the valley flag VALLEY=1 and the minimum time flag MIN_TOFF=0, i.e., the corresponding second timer, e.g., 80, is not timed out yet, i.e., the second determined time is not expired. From phase P4, a transition T41 to phase P1 is performed when such second timer times out, i.e., minimum timer flag MIN_TOFF=1. This second determined time duration for the fixed minimum time flag signal MIN_TOFF is thus chosen as the time after which the fourth phase P4 is enabled, in order to avoid skipping cycles. In particular, the length of the timeout for the flag MIN_TOFF has to be minimized (for efficiency reasons as explained before) but so that in the first place the first high side switch: LS1 remains activated (during the cumulative time in phase P3 plus phase P4) for a time longer than its feasible minimum time, then the second low side switch LS2 has to remain activated (during the cumulative time in phase P4 plus phase P1) for a time longer that its feasible minimum. Thus, the solution provides that in the state corresponding to phase P3, the first low side switch LS1 is operated, but if the valley flag assertion, i.e., VALLEY=1, arrives too early, this meaning that the first low side switch LS1 is activated for a duration which is lower than its feasible minimum, then the system moves into state or phase P4, in which LS1 is still operated and remains operated for a duration (cumulative time in state P3 plus state P4) longer than its feasible minimum. The same apply then for the second low side switch LS2, since in state P4 it is operated.

From another point of view, when the input voltage VIN is close to the output voltage VOUT, both the cases when HS1=1=LS2 as well as HS2=1=LS1 would get really short, since there is no need to charge (HS1=1=LS2) and discharge (HS2=1=LS1) the coil much, therefore the "accommodating/buffer" state P4 is introduced, but its time length is minimized.

Further, it should be not only the minimum on-time of the first low side switch LS1 to be taken in consideration, but the minimum off-time of first high side switch HS1. The slowest power switch is the one that should be considered in setting the time length for the timeout MIN_TOFF (the same apply for LS2 and HS2).

Thus, the control signal c(t) is sent to the converter 10 by a logic control module 100 which implements the transitions of the state diagram of FIG. 5 controlling the closing and opening states of the switches HS1, LS1, HS2, LS2. The control module 100, e.g., a Finite State Machine, receives the flags PEAK and VALLEY from a RHCP control circuit, e.g., circuit 60 in FIG. 10, the flag TIMER_BUCK from a timer circuit, e.g., circuit 70 shown in FIG. 12, and the flag MIN_TOFF from a further timer circuit, e.g., circuit 80 in FIG. 13. These modules 100, 60, 70, 80, with the addition of a current sensor, e.g., sensor 90, detecting the current flowing in the converter 10, may represent altogether a control circuit for controlling the NIBB converter 10 according to the method here proposed and indicated with reference to FIG. 5. Under this view, the control module 100 may perform the control also issuing also the reset signals $RST_{BU}$, $RST_{MIN}$, to start detection of time intervals in circuits 70, 80 when the corresponding states are entered, e.g., P2 and P3.

Figure 7A:
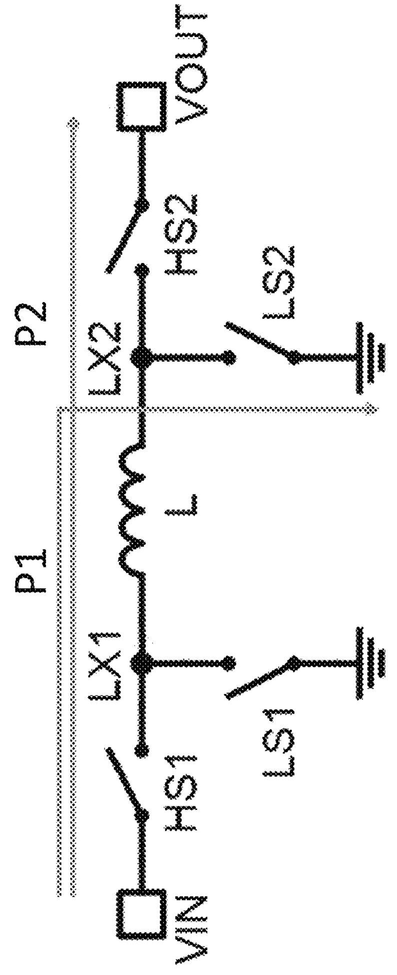
FIGS. 7A, 7B, 7C show respectively a circuit diagram of a converter controlled by a method in a first control mode, a time diagram of a coil current in said first control mode and a table of states of switches of the converter in said first control mode.
Figure 7B:
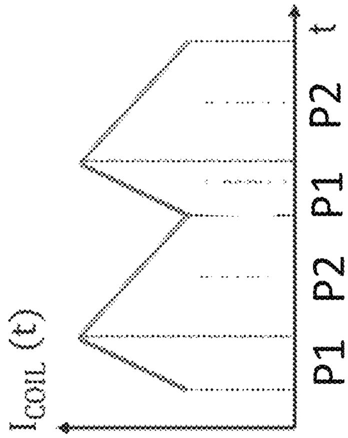
Figure 7C:
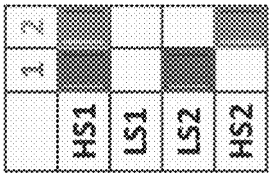
Figure 8A:
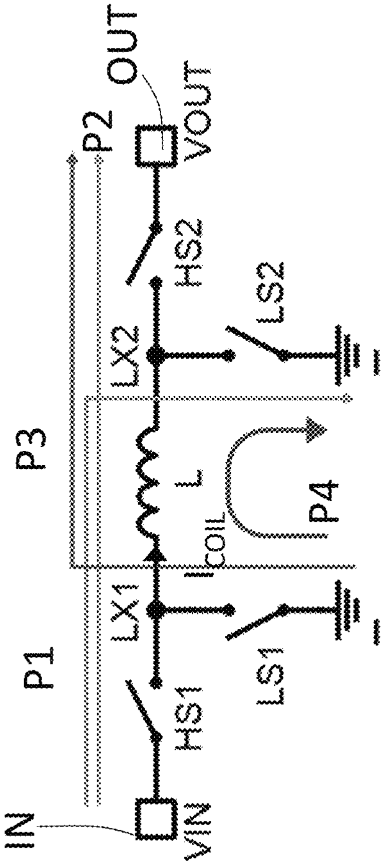
FIGS. 8A, 8B and 8C show respectively a circuit diagram of a converter controlled by a method in a second control mode, a time diagram of a coil current in said second control mode and a table of states of switches of the converter in said second control mode.
Figure 8B:
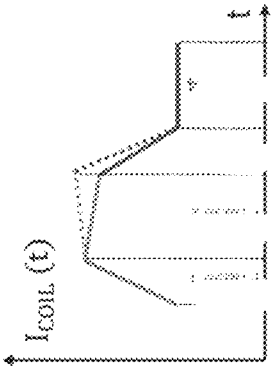
Figure 8C:
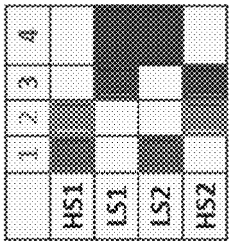
Figure 9C:
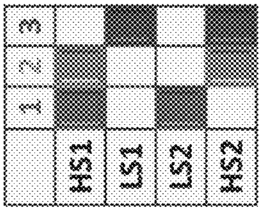
FIGS. 9A, 9B and 9C show respectively a circuit diagram of a converter controlled by a method in a third control mode, a time diagram of a coil current in said third control mode and a table of states of switches of the converter in said third control mode.
Figure 9B:
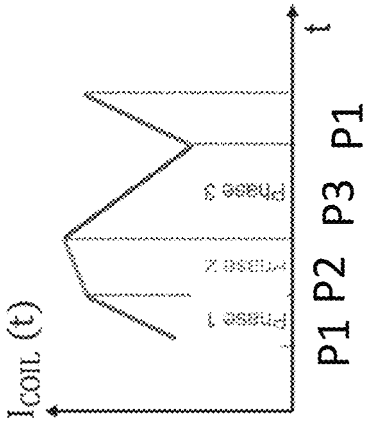
Figure 9A:
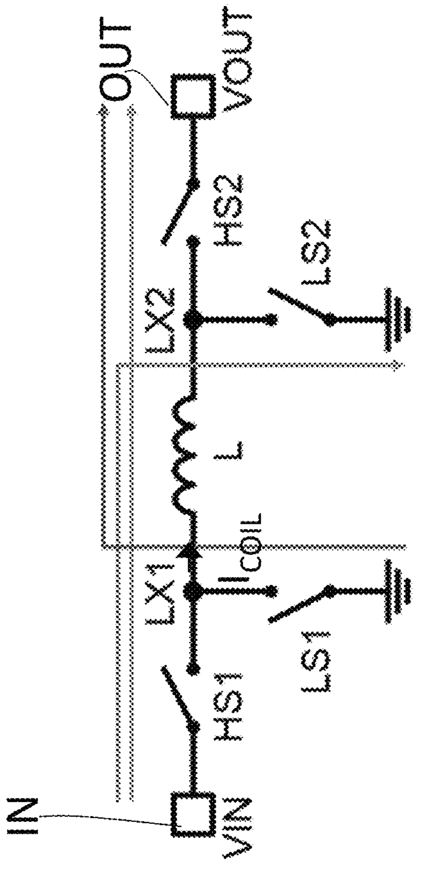

Depending on the events and transitions indicated in FIG. 5, the NIBB converter 10, shown in FIG. 6A with the respective paths in the different phases P1, P2, P3, P4, may operate differently, and particularly three operating modes may be possible on the basis of the state diagram of FIG. 6A:

- a first mode in which the NIBB converter 10 operates is a step-up mode. In this first mode the NIBB converter 10 is operated as a hysteretic-current-ripple-controlled boost converter, acting only the second half bridge HB2 (i.e., switching the second high side switch HS2 and low side switch LS2), while the first half bridge HB1 is not switched (i.e., low side switch LS1 left off and high side switch HS1 fixed on). This corresponds to performing transitions T12 and T21 in the diagram of FIG. 5 at each switching cycle of the control signal controlling the switches.! The performances are maximized, in fact the DC-DC NIBB converter 10 regulates with the classic two-phases triangular coil current, as shown in FIG. 7B. According to the state diagram of FIG. 5, in the phase P1 (e.g., the first state in FIG. 5) the NIBB converter 10 charges the coil L—as in a classical boost DC-DC—and this phase P1 lasts until the coil current $I_{COIL}$(t) peak value is reached (peak flag PEAK=1); in the next phase, P2, the coil L is discharged until the coil current $I_{COIL}$(t) valley value is reached (valley flag VALLEY=1) and the NIBB converter 10 starts a new switching cycle with phase P1. It is to be noted that in the state corresponding to phase P2 not only the valley coil current $I_{COIL}$(t) is monitored, but also the time-out of the adapted analog time detection circuit (or timer) producing the timer flag TIMER_BUCK: this circuit indicates that the second phase P2 has reached a maximum possible time limit and is adapted (i.e., it depends on, e.g., proportional) to the difference of the input and output voltage, $V_{IN}$-$V_{OUT}$. This means that if the input voltage $V_{IN}$ varies getting closer to the output voltage value, the first determined time decreases, determining in time the assertion of the timer flag TIMER_BUCK before the valley flag VALLEY is asserted. However, in step-up mode, with VIN much lower than VOUT, the coil valley current $I_{COIL}$(t) is detected prior the time-out of the detection circuit producing the time flag TIMER_BUCK; as mentioned, this happens when the input voltage $V_{IN}$ is much lower than the output voltage $V_{OUT}$, lower to a point that the valley flag VALLEY=1 occurs before the timer flag TIMER_BUCK=1. It is emphasized that the length of the time out producing the timer flag TIMER_BUCK is measured starting from the beginning of the second phase P2;
- a second mode, buck-boost mode: here the NIBB converter 10, as shown in FIGS. 8A-8C, exploits the 4-phases trapezoidal coil current operation and as mentioned, the DC-DC converter 10 operates in this mode when the input voltage $V_{IN}$ is close to the output voltage $V_{OUT}$, i.e., so that the timer flag TIMER_BUCK has sufficient time to be asserted before reaching the valley of the control signal. The switching cycle starts from phase P1, which is the same as the previous mode; as said, in this case, in phase P2 the first triggering event is not the valley coil current detection (VALLEY=1) as in the previous mode, but the time-out of the first timer setting to 1 the timer flag TIMER_BUCK, which triggers the transition T23. The NIBB converter 10 moves to the state corresponding to phase P3 and the coil current $I_{COIL}$(t) is discharged as in a classic buck DC-DC: in other words, it is discharged with the steepest possible slope $V_{OUT}$/L (i.e., fastest discharge). In phase P3, the coil current $I_{COIL}$(t) valley is still monitored, i.e., it is detected if the valley value is reached, as in phase P2, but a minimum timer, asserting the minimum flag MIN_TOFF, is also monitored. It is emphasized that the length of the time out producing the timer flag MIN_TOF is measured starting from the beginning of the second phase P3. In this mode, the first triggering event is the detection of the valley coil current $I_{COIL}$(t) value, prior that the second minimum timer has reached the time-out setting to 1 the flag MIN_TOFF; this indicates that such phase P3 is short (i.e., coil current discharged with the steepest slope only for a short period) and the system moves in state P4, in which the coil current $I_{COIL}$ is maintained until the aforementioned minimum timer reaches the time-out and asserts the flag MIN_TOFF. The coil current $I_{COIL}$(t) in this operative mode is reported in FIG. 8B, in which in phases P2 and P3 the dashed line refers to the case of the input voltage $V_{IN}$ being slightly above the output voltage $V_{OUT}$, i.e., the coil current increase during phase P2, while the continuous line refers to the case when the output voltage $V_{OUT}$ is slightly above the input voltage $V_{IN}$, i.e., the coil current decrease during phase P2 (in case of $V_{IN}$=$V_{OUT}$ the coil current $I_{COIL}$(t) in the second phase P2 would be flat); and
- a third mode, step-down mode. In this mode the NIBB converter 10 is operated exploiting a 3-phases coil current operation—as depicted in FIGS. 9A-9C—and as it will be clear, this is the case when the input voltage $V_{IN}$ is much higher than the output voltage $V_{OUT}$. Here the operation is similar to the previous buck-boost mode, with the only difference of avoiding the last and fourth phase, i.e., P4. In fact, when the state of phase P3 is reached, the minimum timer setting the flag MIN_TOFF triggers prior the detection of the valley current $I_{COIL}$(t) (transitions T31), VALLEY=1 and MIN_T-

OFF=1, i.e., the system moves from phase P3 to phase P1 when VALLEY=1 and the time length of the time out for the flag MIN_TOFF has elapsed, indicating that the coil discharge with steep slope is not short, but it is lasting for a sufficient time to allow proper switching of the first low side switch LS1 (i.e., sufficient on-time).

In step-up mode, first mode, the NIBB converter 10 performs as a ripple-hysteretic-current-controlled DC-DC, while in the other modes, second, buck-boost, and third, step-down, the control procedure is no longer ripple-hysteretic-current-mode, but it becomes hybridized. In fact, in buck-boost mode as well as step-down, the control voltage $V_c$ does not control the real peak coil current anymore. During the first phase P1, the control voltage $V_c$ fixes a given amount of current that must be stored within the coil L; it is emphasized that only in step-up mode this corresponds to the peak of the coil current $I_{COIL}(t)$ value. Indeed, in the second phase P2 the coil current $I_{COIL}(t)$ can still increase (if $V_{IN}>V_{OUT}$) or decrease (if $V_{OUT}>V_{IN}$). Ideally, without considering losses, in the solution here described the valley of the coil current $I_{COIL}(t)$ is always fixed by the control voltage $V_c$, in fact the coil discharge always ends when the coil current $I_{COIL}(t)$ value specified by means of the control voltage $V_c$ has been detected. It is always the control voltage $V_c$ that indicates the coil peak and valley currents, in fact the algebraically added voltage shifts are fixed/constant since not controlled by any loop. They are indeed tuned according to the input voltage $V_{IN}$ and output voltage $V_{OUT}$, but—again—not controlled by any loop. Considering now the non-ideality and losses, being the fourth phase P4 lossy, the coil current $I_{COIL}(t)$ does not remain perfectly flat, but slightly reduces, being dissipated by the first low side switch LS1 and the second low side switch LS2 on resistances.

Figure 3A:
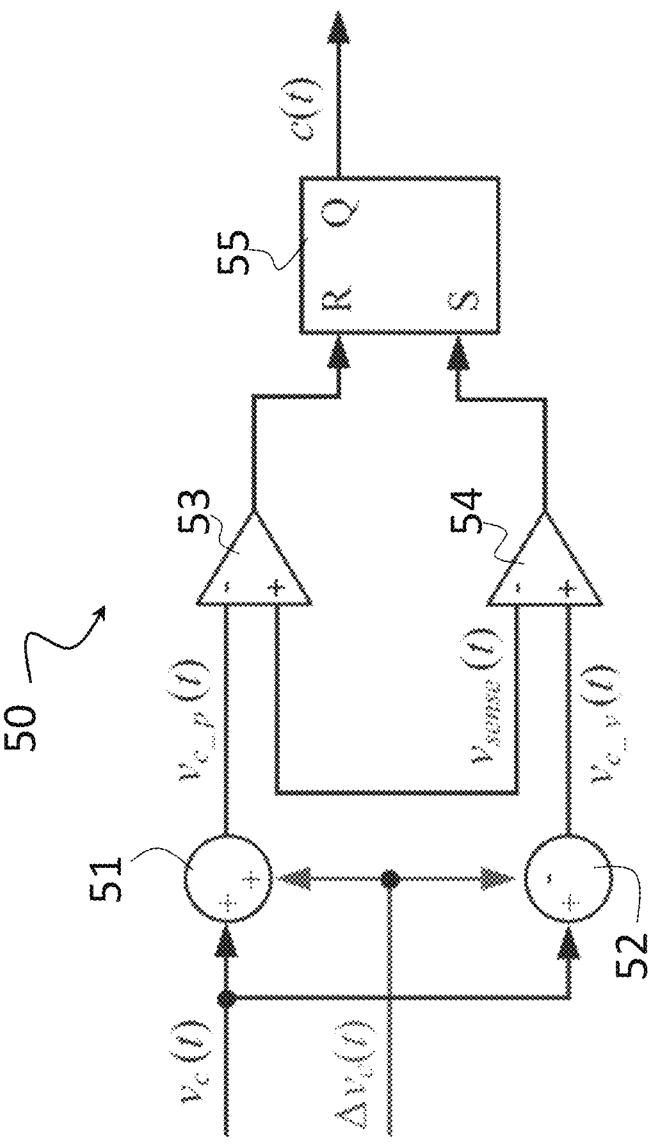
Figure 3B:
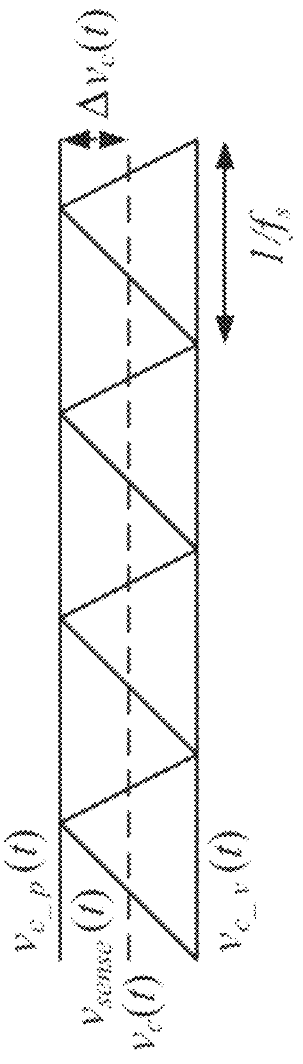

A switching cycle of the control signal c(t) is the periodicity with which the control signal c(t) issued by the control module, as shown in FIG. 3A-3B or in the following with reference to FIGS. 10-11 repeats itself, specifically repeats its pattern of phases, e.g., the two phases P1-P2 in first mode, the four phases P1-P2-P3-P4 in second mode, the three phases P1-P3 in third mode. In other words, the periodicity may be defined in general by the repetition of the first phase P1 which is the phase always performed in each cycle of each mode at the beginning.

Figure 10:
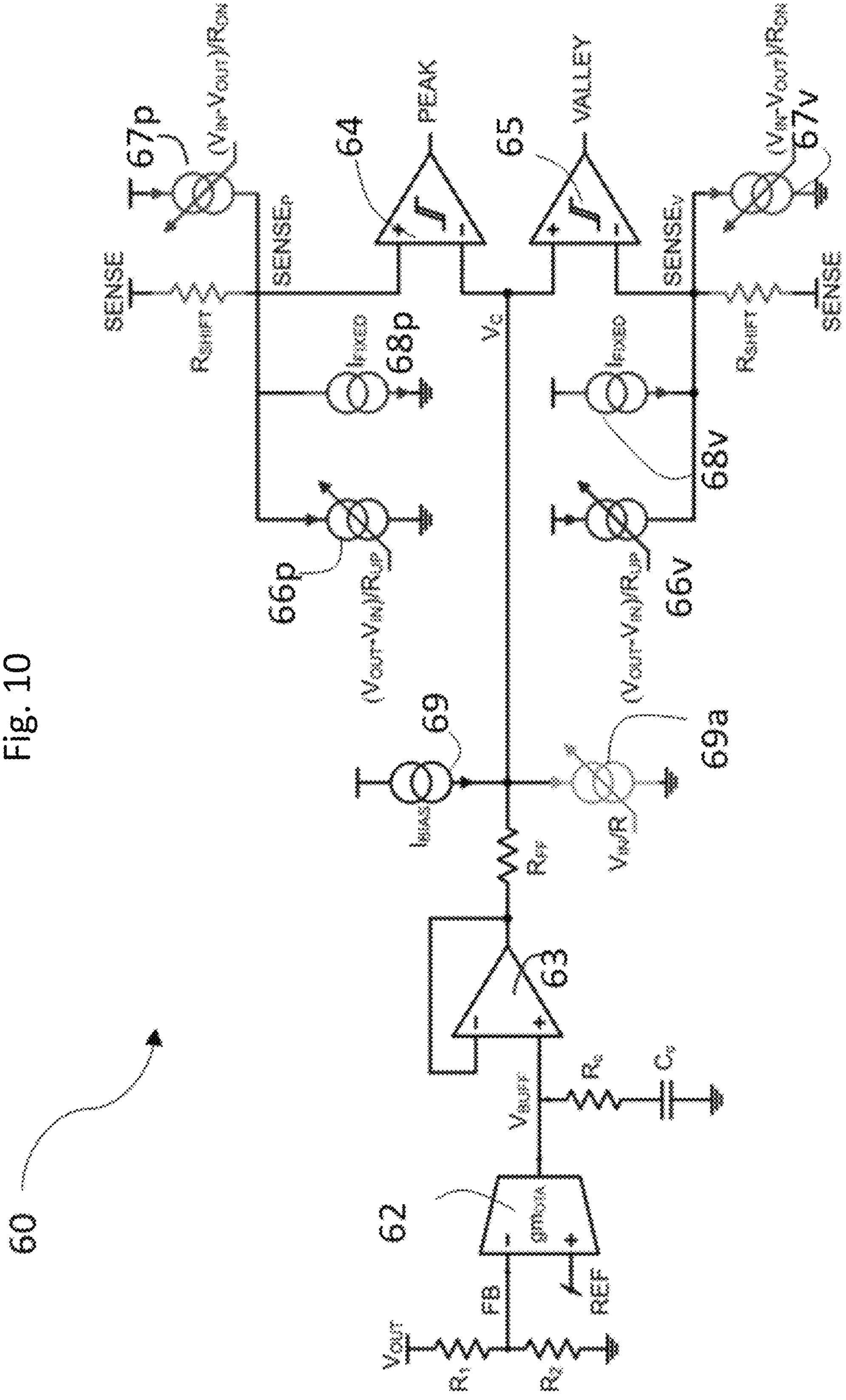
FIG. 10 is shown a circuit schematic diagram showing part of a circuit implementation of a control circuit implementing said method.
Figure 12:
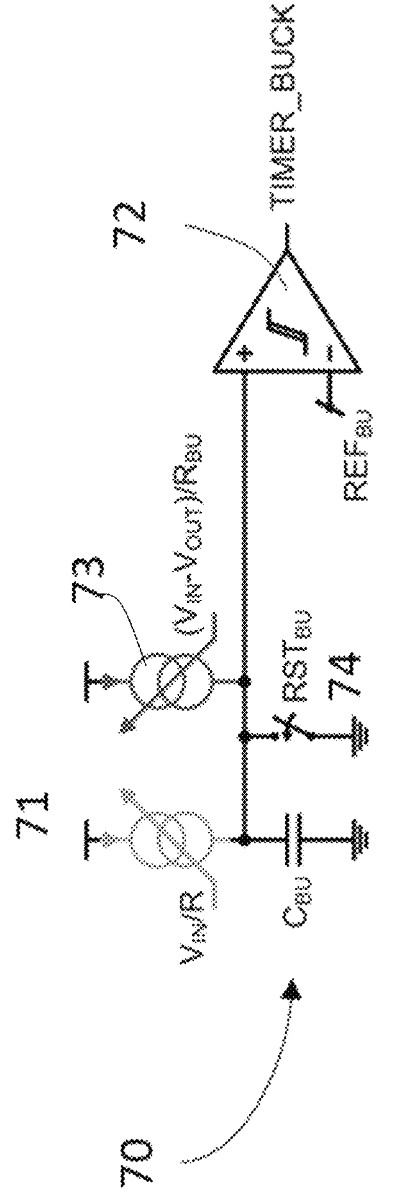
FIG. 12 and FIG. 13 show a circuit schematic diagram of implementations of timers used by the control circuit implementing the method.
Figure 13:
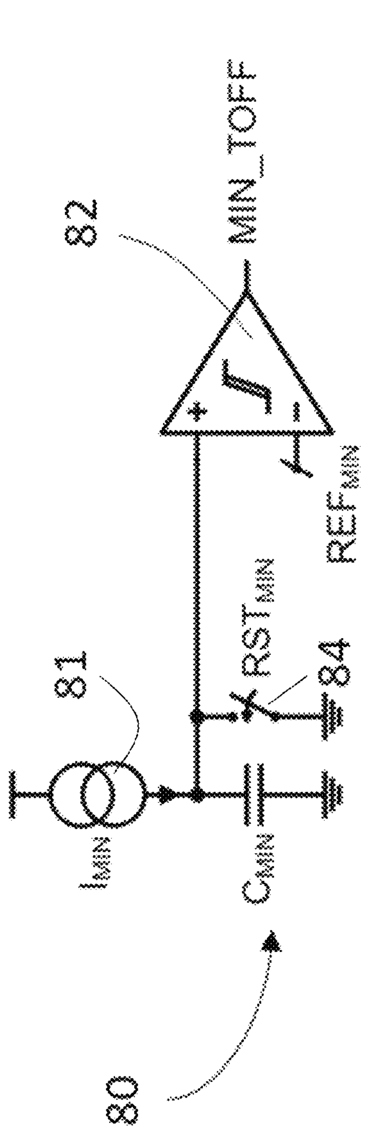
Figure 14:
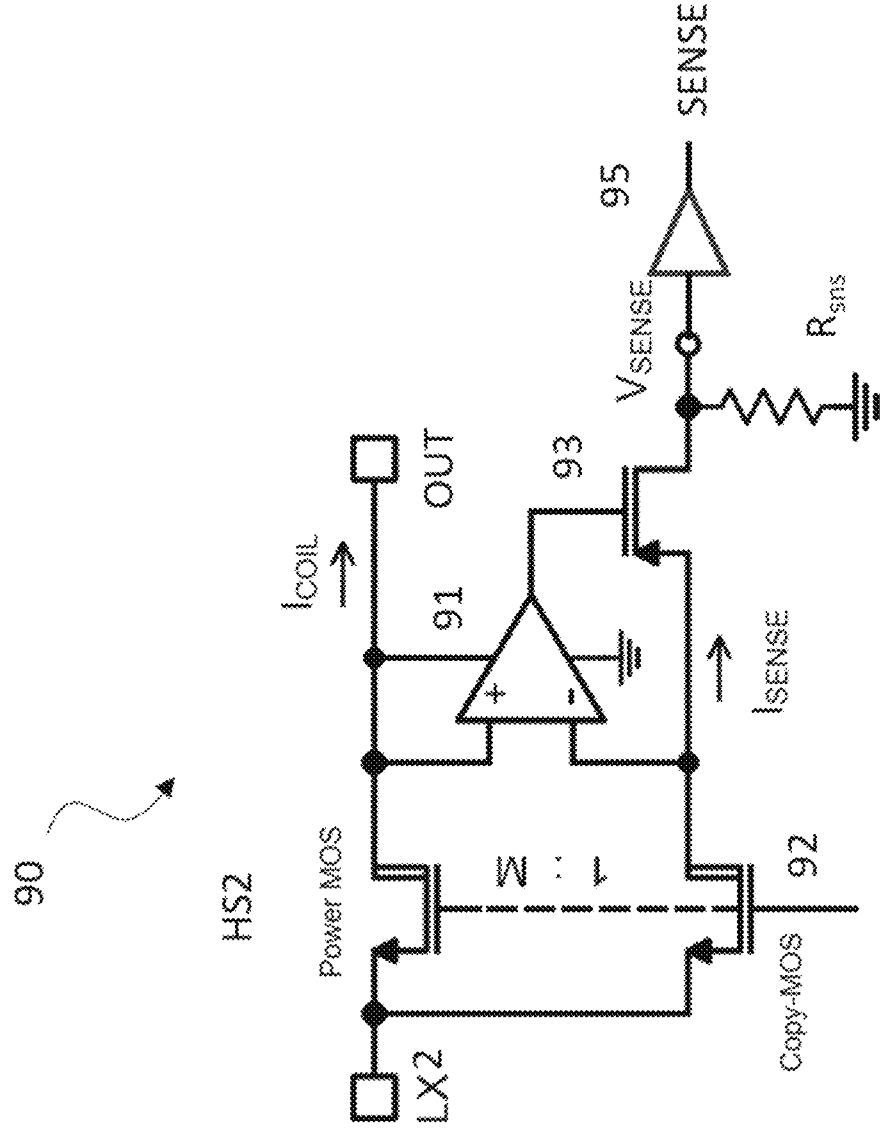
FIG. 14 is a circuit schematic diagram of a sensor used by the control circuit implementing the method.

FIG. 10 reports a possible implementation of the proposed solution. It shows a portion of the control circuit 60 which issues the control voltage $v_c(t)$ and the valley flag VALLEY and peak flag PEAK thereof. FIGS. 12 and 13 show the part of the control circuit 60 operating as timers 70, 80, while FIG. 14 shows a current sensor which supplies the sense current to the control circuit 60. A voltage buffer may be present between the current sensor and the terminals on which the sense current is supplied forming the sense voltages $SENSE_p$, $SENSE_n$ as described below.

The control circuit 60 comprises an error amplifier 62, implemented by an Operational Transconductance Amplifier (OTA) which calculates an error between a feedback signal FB, e.g., taken from the converter output, e.g., the output voltage $V_{OUT}$ or a signal obtained from it by a feedback network and a reference signal REF, e.g., a reference voltage for the output voltage $V_{OUT}$, and supplies such error, through a buffer 63 as control voltage Vc to a peak detector 64 and to a valley detector 65, both comparators, respectively to the negative and positive input, so that the offset is added with opposite sign as explained below. The error amplifier 62 generating the control voltage $V_c$ is in the example an OTA with a type-II compensation network, but in general it can be also an operation amplifier with a compensation network locally closed in feedback on the feedback signal FB. With SENSE is indicated a low-impedance voltage signal provided by a circuit, that performs coil current sensing monitoring the coil current $I_{COIL}(t)$ and providing a voltage scaled replica, i.e., SENSE, with a proportionality factor G. Such circuit is not shown in the figure, but an example of such circuit, indicated with 90, performing current sensing monitoring is shown in FIG. 14. From the low impedance voltage SENSE, two offset voltages are added—identical in magnitude and opposite in sign—thus obtaining a down-shifted sense voltage $SENSE_p$, at the other input of the valley comparator 64, and an up-shifted voltage sense $SENSE_v$, at the other input of the peak comparator 65, respectively down-shifted and upshifted of a offset quantity $\Delta V_c = R_{SHIFT}(I_{FIXED}+I_{UP}-I_{DOWN})$, where $R_{SHIFT}$ indicates a shift resistance in series between the voltage SENSE and a node, respectively the positive input of peak comparator 64 and negative input of valley comparator 65, where three currents are summed, respectively a up current $I_{UP}$ which indicates a positive current which value is proportional, through an up resistance $R_{UP}$ value, to the difference between $V_{OUT}$ and $V_{IN}$ (when the input voltage $V_{IN}$ is higher than the output voltage $V_{OUT}$ the current is clamped to 0), a down current $I_{DOWN}$, referring to the difference between $V_{IN}$ and $V_{OUT}$ (when the output voltage $V_{OUT}$ is higher than the input voltage $V_{IN}$ the current is clamped to 0) and with another proportionality factor, a down resistance $R_{DN}$, and a fixed current $I_{FIXED}$. Such currents, up current $I_{UP}$, down current $I_{DOWN}$, fixed current $I_{FIXED}$, are shown as generated by current generators 66*p*, 67*p*, 68*p* for the peak branch, and 66*v*, 67*v*, 68*v* for the valley branch, respectively. In general, the control voltage $V_c$ could be directly obtained from the error amplifier 62, or as depicted in the figure, it can be obtained adding a feedforward action, i.e., a fast out-of-the-loop compensation that allows to improve specific transients/events, on top of the voltage provided by the error amplifier; this is not compulsory and it is used to optionally introduce specific feedforward actions to increase the transient performance on particular events. For example, when the input voltage $V_{IN}$ experiences a dip, instead of waiting the slow compensated action from the error amplifier 62, the control voltage $V_c$ is directly up-shifted, allowing the DC-DC converter 10 to suddenly increase its coil current and improve the output transient.

In FIG. 10, resistors R1 and R2 represent a biasing network of the input of the amplifier 62, while series of resistor $R_c$ and capacitor $C_c$ coupled between the positive input of the buffers 63 (on which a voltage $V_{BUFF}$ is formed) and ground operates as a Type-II compensation network, e.g., $$C_C = 70\text{ pF},\ R_c = 90\ k\Omega,\ r_0^{OTA} = 10\text{M}\Omega.$$

Between the output of the buffer 63 and the comparators 64, 65 inputs (64 positive, 65 negative) is a feed forward resistance $R_{FF}$ and a bias current generator 69 inputs a bias current in the feed forward resistance $R_{FF}$ and therefore sunk by the voltage buffer 63, while a variable current proportional, through a resistance R, to the input voltage $V_{IN}$ is inputted in the same node by a variable generator 69*a*.

The peak current, or better, the coil current charge, detection in the peak comparator 64 triggers when the sensed coil current signal plus its down-shift, i.e., offset quantity, $\Delta V_C$ (or minus its shift $\Delta V_C$) reaches the control voltage $V_C$, triggering the comparator 64 to indicate PEAK=1 (i.e., asserted, e.g., output logic high). In the same way, the valley current detection in the valley comparator 65 triggers when the sensed coil current signal plus its up-shift, i.e., offset quantity, $\Delta V_C$ (or simply plus its shift $\Delta V_C$) reaches the control voltage $V_C$, triggering the comparator to indicate VALLEY=1. In a general implementation, a single comparator may be used to detect both the events, by simply multiplexing its inputs; moreover, the polarity of such event is not strict, but can be selected according to another rule or formality. In the implementation shown in FIG. 10, the offsets $\Delta V_C$ have been introduced on the coil current sensed voltage, while the control voltage $V_C$ has been directly monitored with comparators 64, 65. For such reason and to be precise, the offsets $\Delta V_C$ should not be called $\Delta V_C$, but $\Delta V_{SENSE}$, which are perfectly equivalent, since they define a ripple coil current $\Delta I_{COIL}$ on the coil L. Nonetheless, another equivalent and possible implementation would create exactly the offset $\Delta V_C$ on the control voltage $V_C$, obtaining $V_{C\_V}$ and $V_{C\_P}$, as shown in FIG. 11.

It is important to note that the dependency of the offset $\Delta V_C$ on the input voltage $V_{IN}$ and the output voltage $V_{OUT}$ is introduced to reduce and compensate a ripple coil current $\Delta I_{COIL}$ over the input voltage $V_{IN}$ and the output voltage $V_{OUT}$, in order to equalize the switching frequency over all the possible variations of the input voltage $V_{IN}$ and the output voltage $V_{OUT}$. In many applications, the switching frequency is not to imposed and mandatory to be constant, but making dependent the ripple coil current $\Delta I_{COIL}$ over the input voltage $V_{IN}$ and the output voltage $V_{OUT}$ allows to reduce the switching frequency spread.

If $V_{IN}<V_{OUT}$:

$$\Delta I_{COIL} \propto \frac{2R_{SHIFT}(I_{FIXED} + |VOUT - VIN|/R_{UP})}{G}$$

If $V_{IN}>V_{OUT}$:

$$\Delta I_{COIL} \propto \frac{2R_{SHIFT}(I_{FIXED} - |VOUT - VIN|/R_{DN})}{G}$$

Thus, if the input voltage $V_{IN}$ is lower than the output voltage $V_{OUT}$ the ripple coil current $\Delta I_{COIL}$ is proportional to the sum of the fixed current $I_{FIXED}$ and the up current $I_{UP}$, (multiplied by the ration of 2Rshift/G), while if the input voltage $V_{IN}$ is greater than the output voltage $V_{OUT}$ the ripple coil current $\Delta I_{COIL}$ is proportional to the sum of the fixed current $I_{FIXED}$ and the down current $I_{DOWN}$ (multiplied by the ratio of 2Rshift/G).

The two discussed analog timers, i.e., counting the time-out of an adapted analog counter (a timer flag TIMER_BUCK set to 1) and, respectively, counting the time-out of a fixed minimum timer (fixed minimum timer MIN_TOFF set to 1), can be implemented as described with reference to FIG. 13 which refers to a first timer 70 detecting the time-out with respect to the buck timer flag TIMER_BUCK. In this case, a variable current proportional, through a resistance R, to the input voltage $V_{IN}$ is inputted in the same node by a variable generator 71, i.e., an adapted current $V_{IN}/R$, is provided on a given buck timer capacitor $C_{BU}$, thus producing a voltage ramp on the positive input of a comparator 72 with hysteresis. Such comparator 72 triggers when such voltage ramp equals a buck reference voltage $REF_{BU}$, signaling the timeout. The capacitor $C_{BU}$ is discharged by setting a reset switch 74, controlled by a reset signal $RST_{BU}$, coupling the generator 71 to ground. The next timeout detection starts when a reset switch 74, coupling the input of the comparator 72 coupled to the capacitor $C_{BU}$, upon assertion of the reset signal $RST_{BU}$, is de-asserted. A current generator 73 supplies a current $(V_{IN}-V_{OUT})/R_{BU}$, $R_{BU}$ being a resistive proportionality factor, in the buck timer capacitor $C_{BU}$.

Referring to the state diagram of FIG. 5, the switch 74, or equivalently the reset signal $RST_{BU}$ is de-asserted, i.e., lets the capacitor $C_{BU}$ charge, in the second phase P2, while in the other phases it is asserted, inhibiting operation, meaning that this timer 70 detects only during the second phase P2.

Again, the timer 70 has been made dependent on the voltages $V_{IN}$ and $V_{OUT}$ (by the current generator 73) mainly for optimization purposes, in order to equalize the switching frequency over all the possible variations of the voltages $V_{IN}$ and $V_{OUT}$. Particularly, a current proportional to the input voltage $V_{IN}$ is always employed, while when $V_{IN}>V_{OUT}$ another (always positive) contribution proportional to the difference between $V_{IN}$ and $V_{OUT}$ is exploited (when $V_{IN}<V_{OUT}$ such current is clamped to zero).

FIG. 13 depicts the timer 80 for the minimum fixed time flag MIN_TOFF. The principle of operation is similar to that of the timer 70, but the current charging the capacitor here is fixed constant. In this case, a fixed current $I_{MIN}$ is inputted by a current generator 81 in a fixed minimum time capacitor $C_{MIN}$, thus producing a voltage ramp on the positive input of a comparator 82 coupled to the same node of the minimum time capacitor $C_{MIN}$. Such comparator 82 triggers when such voltage ramp equals a reference voltage $REF_{MIN}$, signaling the timeout. The capacitor $C_{MIN}$ is discharged by setting a reset switch 84, controlled by a reset signal $RST_{MIN}$, coupling the current generator 81 to ground. The next detection of time out starts when the reset switch 84 is de-asserted through the reset signal $RST_{MIN}$.

Referring to the state diagram of FIG. 5, the timer reset signal $RST_{MIN}$ is asserted in phases P1 and P2, while de-asserted in phases P3 and P4, meaning that this timer 80 detects the time out during phase P3 and possibly P4.

Thus, the control comprises at least with respect to said detection of the expiration of a variable first time interval, e.g., flag TIMER_BUCK, measured from the entering in said second state P2 and detection of the expiration of a variable second time interval, e.g., flag MIN_TOFF, measured from the entering in said third state P3, sending respective reset signals $RST_{BU}$, $RST_{MIN}$ starting said measuring.

Of course, in general, a timer can be implemented differently, also digital counters can be employed.

In the following Table 1, the ideal timings for each phase are reported for the CCM (continuous current mode) case; given the complexity of the results, only the ideal case without losses is presented. Once the ripple coil current, defined as $\Delta I_{COIL}$, is fixed (by setting the value of the control voltage offsets $\Delta V_C$) as well as the durations of the time-out for the timers, e.g., 70 and 80, (the timeout signalled by flags $MIN_{TOFF}$ and $TIMER_{BUCK}$), the switching frequency $F_{SW}$ and the duration or length of phases P1, P2, P3 and P4 are defined, as shown in Table 1.

TABLE 1

| | Step up mode | Buck boost mode | Step down mode |
|---|---|---|---|
| fsw | $V_{IN} * (V_{IN} - V_{OUT}) / \Delta I_{COIL} * L * V_{OUT}$ | $V_{IN} / (V_{IN} * (MIN_{OFF} + TIMER_{BUCK}) + \Delta I_{COIL} * L)$ | $V_{IN} * V_{OUT} / TIMER_{BUCK} * V_{IN}^2 + L(\Delta I_{COIL} * V_{IN} + \Delta I_{COIL} * V_{OUT})$ |
| duration P1 | $\Delta I_{COIL} * L/(V_{IN})$ | $\Delta I_{COIL} * L/(V_{IN})$ | $\Delta I_{COIL} * L/(V_{IN})$ |
| duration P2 | $\Delta I_{COIL} * L/(V_{OUT} - V_{IN})$ | $TIMER_{BUCK} = K/V_{IN}/R$ | $TIMER_{BUCK} = K/(V_{IN}/R + (V_{IN} - V_{OUT})/R_{BU}$ |
| duration P3 | 0 | $(TIMER_{BUCK} * V_{IN} + \Delta I_{COIL} * L)/V_{OUT} - TIMER_{BUCK}$ | $(TIMER_{BUCK} * V_{IN} + \Delta I_{COIL} * L)/V_{OUT} - TIMER_{BUCK}$ |
| duration P4 | 0 | $MIN_{OFF} + TIMER_{BUCK} - (TIMER_{BUCK} * V_{IN} + \Delta I_{COIL} * L)/V_{OUT}$ | 0 |

It is important to stress that the boundary of each operating mode is not fixed, but it changes according to the losses, and therefore—for a given input voltage $V_{IN}$ and output voltage $V_{OUT}$—it is dependent on the load current. When the load current increases, the DC-DC converter must increase its duty-cycle and store more charge in the coil L; in other words, the effort of the DC-DC converter 10 increases and the number of pair of values $V_{IN}$, $V_{OUT}$ (i.e., a region if put on a diagram with $V_{IN}$ and $V_{OUT}$ on the axes) for which the converter 10 operates in step-up mode increases, while the number of pair of values $V_{IN}$, $V_{OUT}$ associated to the step-down mode decreases. Thus, the behavior of the converter described above can be simply summarized as follows. The NIBB converter 10 first phase P1 is always performed and is used to energize the coil L. The higher the input voltage $V_{IN}$ and the higher the coil current $I_{COIL}$ slope during this charging phase, i.e., P1, meaning that the coil L easily stores current. The second phase P2 can be a discharging phase (if $V_{IN}<V_{OUT}$), or a charging phase (if $V_{IN}>V_{OUT}$). In a first case, when the input voltage $V_{IN}$ is far from the output voltage $V_{OUT}$, the coil current $I_{COIL}$ slope in time is substantial, therefore the valley current detection, e.g., comparator 65, is designed to be triggered, prior the time-out TIMER_BUCK. It is emphasized that without the buck timer, e.g., 70, issuing the buck time flag TIMER_BUCK, the second phase P2 would never end in the case of $V_{IN}>V_{OUT}$ or $V_{IN}=V_{OUT}$, since the valley current detection 65 would never be triggered. For such reason, a limit on this second phase P2 is posed by means of the buck timer, e.g., 70, issuing the buck time flag TIMER_BUCK. As shown, in FIG. 12, the timer 70 is analog, and a current generator 71 is used to make the time-out duration for the flag TIMER_BUCK dependent on the input voltage $V_{IN}$, allowing the NIBB converter 10 to remain in step-up mode when the input voltage $V_{IN}$ is small, in fact such time-out varies in a way contrary to the coil current slope: the lower the input voltage $V_{IN}$ and the slowest the timer 70, allowing to perform in step-up mode, on the contrary when the input voltage $V_{IN}$ increases, the timer gets to detection of time out faster, while the coil current slope decreases and the valley detection trigger in the comparator 65 happens later. In a second case, if $V_{IN}<V_{OUT}$ but their values are close, the coil L gets slowly discharged without being able to trigger the valley current detection 65. In such second case, the buck timer 70 accelerates its time out detection according to the input voltage $V_{IN}$, also because another current contribution is added. This allows to reduce the duration of the second phase P2, thus equalizing the switching frequency; in fact, for high input voltage $V_{IN}$ values, the coil L is already well charged from the first phase P1 and in the second phase P2 there is no need to additionally store more charge. In buck-boost mode BB as well as in step-down mode SD, the second phase P2 can be identified as a phase in which the current $I_{COIL}$ is transferred to the output without really discharging much the coil L; on the contrary, phase P3 is needed in these two modes to discharge the coil current and transfer it to the load. In this phase P3, especially in buck-boost mode when $V_{IN}<V_{OUT}$ (in which the coil current has already started to decrease in phase P2), the valley detection may be triggered, i.e., VALLEY=1, prior the fixed minimum timer (e.g., 80 in FIG. 13) indicates a time out, setting the fixed minimum time flag MIN_TOFF to 1, meaning that phase P3 duration has been very limited, potentially incurring in minimum power switches acting times. For this reason, the fixed minimum timer, e.g., 80 is adjusted, i.e., by setting the value current $I_{MIN}$, to a value which is the minimum required to allow proper driving of the switches LS1 and LS2 as explained above. In case of such fixed minimum timer is not triggered when the valley current detection 65 triggers, an additional extended phase P4 is added, in which the coil current $I_{COIL}$ is maintained. In this way, a time buffer is added to properly accommodate the first low side switch LS1 driving circuits and start phase P1 with the second low side switch LS2 already turned on, thus allowing in turn phase P1 to not be limited by the second low side switch LS2 driving circuits (and therefore its operating times).

As already mentioned, the time out signaled by the flag TIMER_BUCK and especially the added offset $\Delta V_c$ are chosen to equalize the switching frequency $F_{SW}$ over the entire range of the input voltage $V_{IN}$ and output voltage $V_{OUT}$. In step-up mode the switching frequency $F_{SW}$ is naturally higher than in the other modes, since only two phases are present. In the same way, the slowest switching frequency $F_{SW}$ is associated to the buck-boost mode, having four phases. From an ideal perspective, this is exactly the desired behavior. In fact, in step-up mode the effort demanded to the DC-DC converter 10 is high, due to a big step-up ratio, therefore the converter 10 must operate faster, i.e., with higher switching frequency $F_{SW}$, to provide as much current as it can (the higher the switching frequency $F_{SW}$ the better). On the contrary, when the input voltage $V_{IN}$ is close to the output voltage $V_{OUT}$, the effort demanded to the converter 10 is near zero, since ideally it should remain "pass-through", without even switching if $V_{IN}=V_{OUT}$ (i.e., the lower the switching frequency $F_{SW}$ the better).

Figure 1:
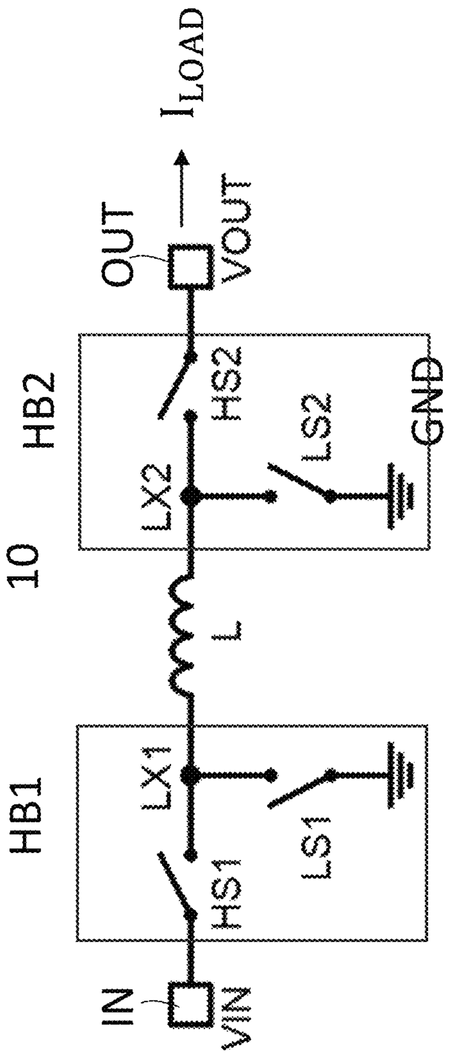
FIGS. 1, 2, 3A, 3B and 4A to 4C have been already described in the foregoing.
Figure 2:
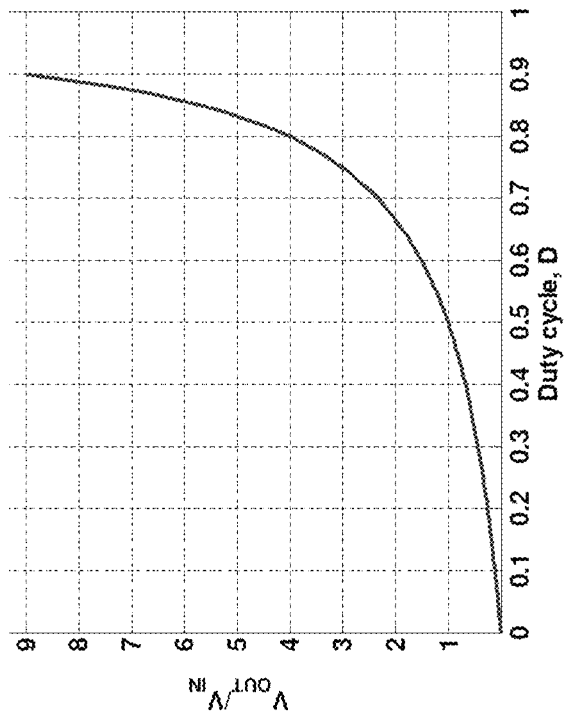
Figure 11:
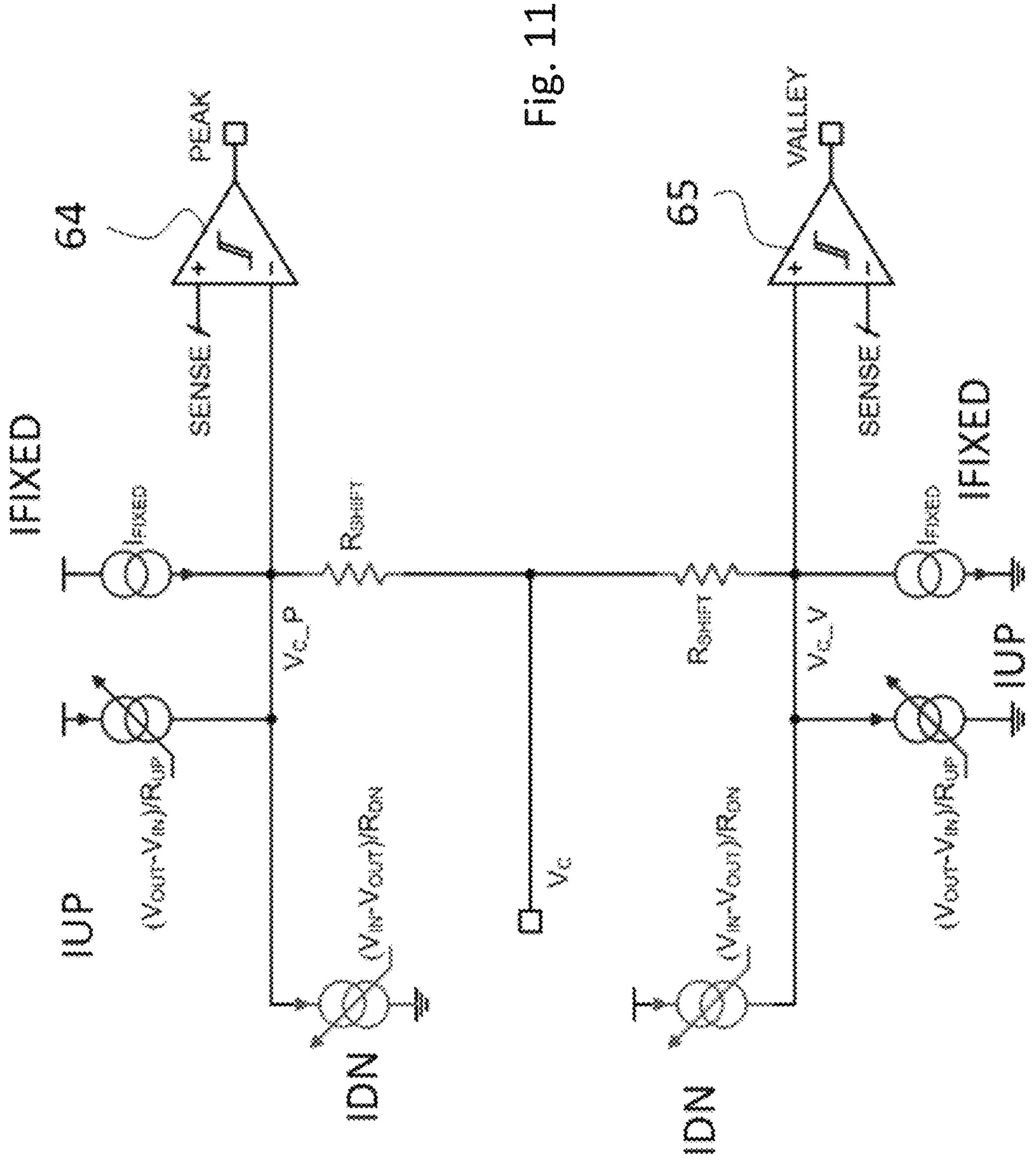
FIG. 11 is a circuit schematic diagram alternative to the implementation of FIG. 10.

Thus, based on the above, the solution here described refers to a method for controlling a non-inverting buck boost DC-DC converter, 10 comprising a first input half bridge HB1 a second output half bridge HB2 as depicted with reference to FIG. 1, such method comprising performing a ripple-hysteretic-current-mode-control on said non-inverting buck boost DC-DC converter 10 comprising providing a control voltage, e.g., $v_c(t)$, based on an error between a feedback signal, e.g., FB, from said output node OUT of said non-inverting buck boost DC-DC converter 10 and a reference signal, e.g., REF;

performing at least a first comparison, e.g., comparator 53 or 64, and a second comparison, e.g., comparator 54 or 65, of said control voltage ($v_c(t)$) with a reference signal, for instance SENSE in FIG. 11, or $SENSE_P$, $SENSE_V$ in FIG. 10, proportional to a current, e.g., $I_{COIL}$, flowing in said coil L, adding and respectively subtracting an offset voltage $\Delta V_c$, in the respective comparison operation, to obtain control signals, e.g., c(t) applied to one or more of said switches HS1, LS1, HS2, LS2 of such converter 10 to drive their opening and closing state—in FIG. 11 the offset voltage $\Delta V_c$ is applied to the control voltage $v_c(t)$ while in FIG. 10 $\Delta V_c = R_{SHIFT}(I_{FIXED}+I_{UP}-I_{DOWN})$ which is used to upshift or down shift the voltage SENSE, to obtain voltages $SENSE_P$, $SENSE_V$—to obtain control signals, such as c(t), applied to one or more of said switches HS1, LS1, HS2, LS2 of said converter 10 to drive their opening and closing state;

wherein said method comprises operating control among a plurality of states, e.g., P1, P2, P3, P4 of operation comprising:

a first state P1 in which said control signals c(t) determine the first high side switch HS1 and the second low side switch LS2 to be closed;

a second state P2 in which said control signals c(t) determine the first high side switch HS1 and the second high side switch HS2 to be closed;

a third state P3 in which said control signals c(t) determine the first low side switch LS1 and to the second high side switch HS2 to be closed; and a fourth state P4 in which said control signals c(t) determine the first low side switch LS1 and the second low side switch LS2 to be closed. Of course, in each state the other switches of the converter 10 not indicated are preferably open, as shown by the current paths in the figures.

Such method comprises performing said at least a first comparison, e.g., 53 or 64, and second comparison, e.g., 54 or 65, detecting respectively reaching a peak voltage, which asserts the flag PEAK, and a valley voltage, which asserts the flag VALLEY;

passing, e.g., transition T12, from the first state P1 to the second state P2 when it is detected reaching said peak voltage, e.g., PEAK=1;

passing, e.g., transition T21, from the second state P2 to the first state P1 when is detected reaching said valley voltage, e.g., VALLEY=1;

passing, e.g., transition T23, from the second state P2 to the third state P3 upon detection of the expiration of a variable first time interval, which in particular asserts the flag TIMER_BUCK, which length varies as a function of a set of detection parameters, for instance R, $C_{BU}$, $R_{BU}$ in circuit 70 in FIG. 12, and decreases with the increasing of said input voltage $V_{IN}$, as one of the currents injected in the capacitor $C_{BU}$ is directly proportional to the input voltage $V_{IN}$, this interval being measured starting from when the control enters the second state P2, i.e., the second phase begins, the transition T23 occurring if the flag TIMER_BUCK is asserted while said control voltage $v_c(t)$ is detected as having not reached said valley voltage, i.e., VALLEY=0;

passing, e.g., transition T34, from the third state P3 to the fourth state P4 when said control voltage, $v_c(t)$ is detected reaching said valley voltage, e.g., VALLEY=1, and a second time interval having a fixed length, in particular set by the current IMIN as shown in FIG. 13, is not expired, i.e., MIN_TOFF=0, this interval being measured starting from when the control enters the third state P3, i.e., the third phase begins; and passing, e.g., transition T41, from the fourth state P4 to the first state (P1) if the second time interval is expired, i.e., flag MIN_TOFF=1.

Also, the length of the first time interval may also decrease as a function of a difference between the input voltage $V_{IN}$ and the output voltage $V_{OUT}$, as shown in FIG. 12, where is proportional through the parameter $R_{BU}$.

It is emphasized that the reset switches of timer 70, 74, and timer 80, 84, are controlled by respective control signals, $RST_{BU}$ and $RST_{MIN}$, which may be issued by the control module 100 itself to timers 70, 80, and are de-asserted, i.e., open during the respective phases P2 and P3, letting the timers 70 and 80 measure their respective time-out. Thus, the control module 100 may as a whole issue a set of control signals comprising signals c(t) to converter 10 switches and the signals controlling the reset switches of the timers 70, 80, i.e., controlling the start of the detection of the corresponding intervals from the beginning of phases P2, P3.

As shown, because of the above transitions, the converter 10 is configured to operate in buck boost mode if the input voltage $V_{IN}$ is close to the output voltage $V_{OUT}$ within a determined voltage range, in a step up mode if the input voltage $V_{IN}$ is lower than the output voltage $V_{OUT}$ outside said range, and in step down mode if the input voltage $V_{IN}$ is greater than the output voltage $V_{OUT}$ outside said range, regulating the passage among said three modes of operation, by selecting the values of the set of detection parameters length and the fixed length of the second time interval. The range in which the input voltage $V_{IN}$ is close to the output voltage $V_{OUT}$ so that it operates as buck-boost depends thus on how are chosen for instance the values of the components and parameters of circuits 70 and 80, this setting determining when the mode changes.

Now, a further embodiment with a start-up method is described.

In a generic DC-DC converter with ripple-hysteretic-current-mode control (RHCMC), regarding the instantaneous coil current it is needed in every single phase of the DC-DC conversion, in order to faithfully detect the peak and valley of the coil current. Typically, in each phase the coil current information is obtained by monitoring—by means of current sensing circuits—the current flowing in the actual power switch that is enabled in the particular phase. In turn, $v_{sense}(t)$ signal is then obtained by summing all the different contributions provided by the different current sensors in each phase (i.e., the coil current information during each phase are combined).

Taking as an example a NIBB DC-DC, like in FIG. 1, depending on its operation, the valley of the coil current may happen when the first low side switch LS1 and the second high side switch HS2 are operated together as well as when first high side switch HS1 and second high side switch HS2 are operated together. In turn, the second high side switch HS2 is the only power switch that is always operated during any coil discharge phase; therefore, sensing the current flowing in the second high side switch HS2 always allows to obtain the instantaneous coil current—and thus the sense voltage $v_{sense}(t)$—to be exploited for the valley current detection. This is the most convenient choice that exploits only a single current sensor to obtain the instantaneous coil current during the coil discharge. This is quite relevant, considering that current sensing circuits are complex circuits that are also very demanding in terms of area and quiescent current.

FIG. 14 depicts a typical current sensor circuit, indicated with 90, based on the replica-MOS (or copy-MOS) concept (also known as "sense FET-based current sensor"), applied on the high-side power-MOS of a boost converter, or in particular on the second high side switch HS2 of the NIBB converter 10 in FIG. 1. The current sensor 90 exploits an amplifier 91 and a copy MOS 92 which is a scaled version of the power MOS, e.g., HS2 (i.e., the copy-MOS is M times smaller than the power-MOS, i.e., its W/L ratio is M times smaller than the W/L ratio of the power MOS HS2). The amplifier 91 is coupled by its positive input with the signal to the terminal of the switch HS2 coupled to the output, i.e., terminal OUT on which the output voltage $V_{OUT}$ is formed, while in the same its negative input is coupled to the same electrode of the copy MOS 92. The other electrode of the copy MOS 92 is coupled to the second inductor terminal LX2, like the switch HS2. By means of a negative feedback loop, the amplifier 91 maintains the drain source voltage of the copy-MOS 92 equal to the drain source voltage of the power MOS HS2; therefore, since these MOSFET transistors are operated with the same gate voltage, a sense current $I_{SENSE}$ flowing in the copy-MOS 92 is a scaled version of the power-MOS HS2 current (i.e., the coil current $I_{COIL}$): $I_{COIL}=M \cdot I_{SENSE}$. The output of the amplifier 91 controls the opening of a MOS switch 93, which allows the sense current $I_{SENSE}$ to transit to a node where a sense voltage $V_{SENSE}$ is taken, in the example on a sense resistor $R_{sns}$ coupled to the other end to ground. The amplifier 91 has one of supply terminal coupled also to the output node OUT, on which the output voltage $V_{OUT}$ is formed, and the other supply terminal to ground. The sense voltage $V_{SENSE}$ is sent in particular as input to a buffer 95 which outputs the voltage signal SENSE, which may correspond to the same voltage signal SENSE in FIG. 11 (or also in FIG. 10).

The flag signals, VALLEY, PEAK, BUCK_TIMER and MIN_OFF are sent, for instance, to a logic module, as the logic control module 100 in FIG. 6A, which sets the converter 10, i.e., operates its switches, in the phases P1, P2, P3, P4, according to the state diagram shown in FIG. 5. In particular, therefore, this logic module can be implemented by a Finite State Machine, although other logic implementation, involving for instance logic gates and/or flip-flops may be possible, or a microprocessor programmed accordingly.

At DC-DC start-up $V_{OUT}=0$ and needs to be charged reaching the desired regulation set-point. The start-up phase must be carefully managed to limit the inrush current and, in general, such phase is performed by slowly ramping up the set-point reference, e.g., signal REF in FIG. 10, in order to slowly charge the bulky output capacitors and reach the final set-point (soft-start). Unfortunately, at the start-up the current sensor 90 is not operating, since VOUT=0 (e.g., the amplifier does not have any supply). In practice, this imply that the sense voltage $v_{sense}(t)$ is not available for a considerable portion of the start-up phase (i.e., until VOUT reaches a minimum value that guarantees the current sensor circuit to properly operate) and no information regarding the valley of the coil current $I_{COIL}$ can be obtained. In this context, any DC-DC converter leveraging a control scheme that needs the valley coil current information is impaired and is not able to perform the start-up, remaining stuck.

Generally, the converter performances must be guaranteed respect to all the possible start-up conditions and variations mainly due to: operation conditions and parameters (i.e., $V_{IN}$, $V_{OUT}$, L, C, parasites, application scenario, etc.); PVT variations; other causes happening after final-test, packaging, and assembly (i.e., aging, soldering, etc.).

In order to avoid the start-up problem a further embodiment is here proposed which temporarily exploits a fixed frequency clock (i.e., a generic timing signal) and initially operates the DC-DC converter 10 in asynchronous mode (i.e., not performing synchronous rectification). This is done until the output voltage VOUT is high enough to guarantee proper headroom for the high-side current sensing circuit (tied to VOUT), which is responsible to reliably provide the coil current information during the coil discharge phase.

Figure 15:
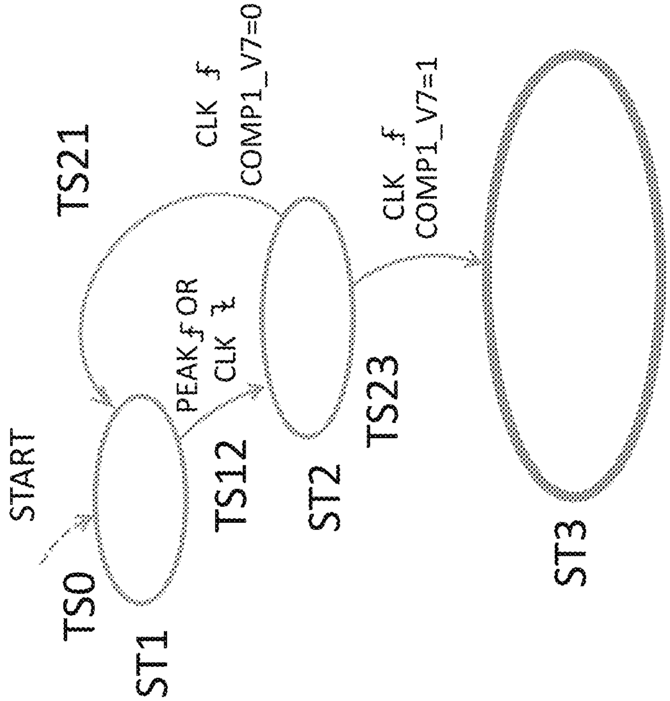
FIG. 15 shows a state diagram illustrating schematically a startup procedure of the converter implementing the method.

FIG. 15 shows a state diagram illustrating schematically a startup procedure of the NIBB converter 10. At start (transition TS0) the converter 10 goes in a first startup phase, or state, ST1. The fixed frequency clock is indicated by CLK. The clock CLK signal rising edge indicates the beginning of the coil charging phase, thus here the first high side switch HS1 is asserted, i.e., closed. Such first startup phase, or state, ST1, lasts until the peak coil current is detected (the current sensor on the first high side switch HS1 is always available and reliable because tied on the input voltage $V_{IN}$), as dictated by the ripple-hysteretic-current-mode-control (RHCMC). This event is signaled by the rising edge of the signal PEAK, provided by a comparator monitoring the sense signal SENSE and a VC_PEAK, which corresponds to the signal $V_{C\_P}$ of FIG. 3A or FIG. 11, which is obtained by summing a given voltage offset $\Delta V_C$ to the control voltage $V_c$ provided by the error amplifier 62, as discussed with reference to FIG. 10. Only the rising edge of the signal PEAK is relevant and carries information which allows a transition TS12 to a state ST2. Either the transition TS12 to a second state ST2 happens on the falling edge of the clock CLK. Thus, the system moves from state ST1 to state ST2 if one of the following conditions happen: rising edge of the flag PEAK (i.e., PEAK goes to 1), or falling edge of the clock CLK (i.e., clock CLK goes to 0).

In a next phase ST2 it is performed a coil discharge. Here only the first low side switch LS1 is asserted, i.e., on or closed, while the power switches HS2, LS2 in the second half-bridge are not asserted: the coil L is discharged exploiting the diode conduction of the second high side switch HS2. It is emphasized that asserting the first low side switch LS1 is not strictly compulsory, since the coil current $I_{COIL}$ would still be discharged exploiting both the diode conduction of switches LS1 and HS2, but for better performance it is suggested to assert also the first low side switch LS1. The next switching cycle starts with the following clock rising edge (TS21 or TS23), meaning that the coil discharge duration in phase ST2 is therefore limited by the clock.

This behavior continues until the output voltage VOUT has reached a minimum value allowing the current sensor on the switch HS2 to correctly operate. In particular, this event is signaled by a comparator circuit, not shown in the figures, which output is labelled COMP_1V7) monitoring the output voltage VOUT respect to a given value (e.g., 1.7V in the example). From such moment the DC-DC converter 10 goes into the state ST3 (transition T23), where is normally operated as a ripple-hysteretic-current-mode-controlled (RHCMC) converter, having the full coil current information available. In particular the NIBB converter 10 can operate according to the state diagram of FIG. 5. The ramp-up phase continues in normal mode and at the end of the setpoint ramp-up the clock can be turned-off, since not used anymore.

Figure 16:
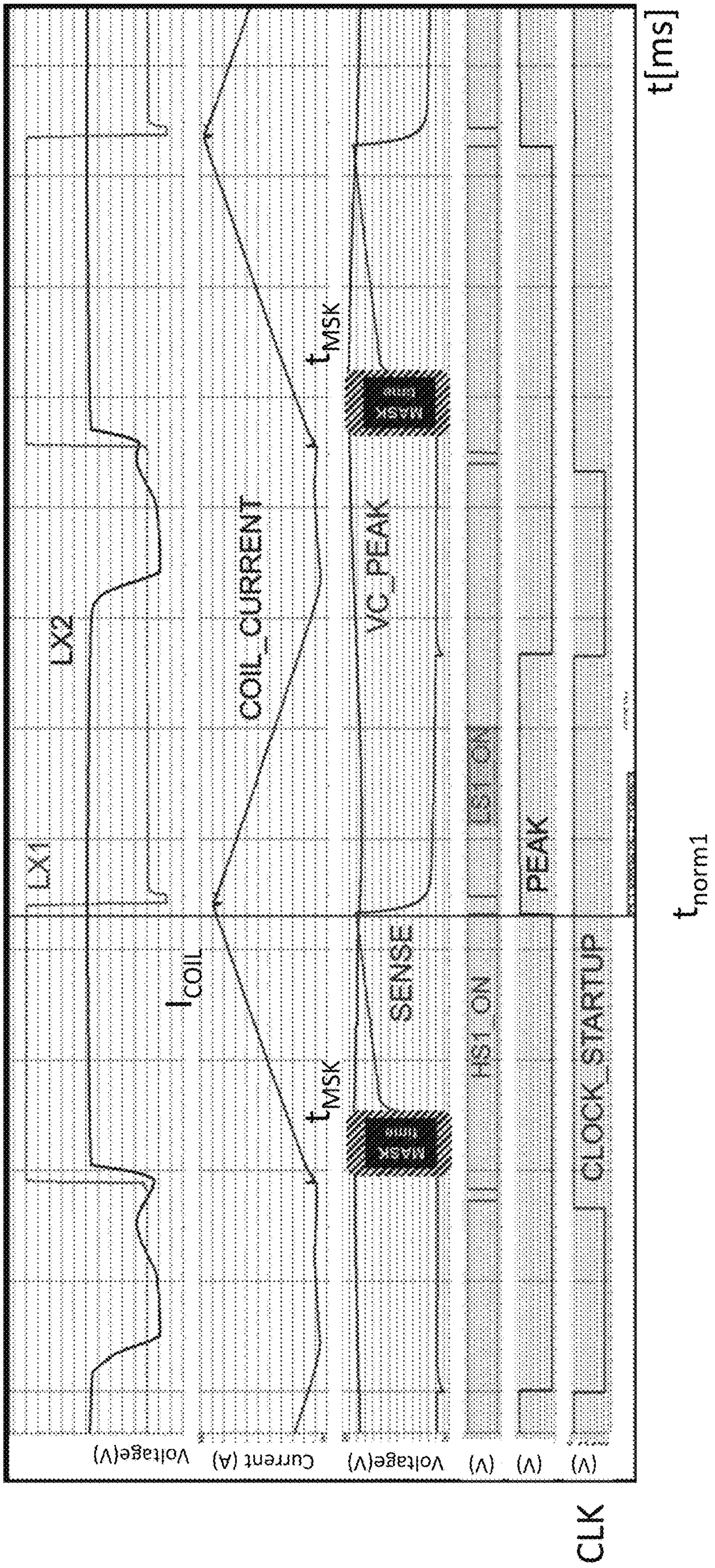
FIG. 16 shows a time diagram, illustrating the operation of the converter during the startup procedure.

FIG. 16 shows a time diagram, which illustrates the NIBB DC-DC operation during the start-up phase showing the voltages on nodes LX1 and LX2, the coil current ICOIL, the sense signal SENSE, the peak control signal VC_P the fixed clock CLK, HS1 and LS1 state, as a function of time. A time $t_{norm1}$ indicates when the peak flag PEAK is asserted, i.e., rising edge, thus triggering transition T12 from state 1 to state 2.

Figure 17:
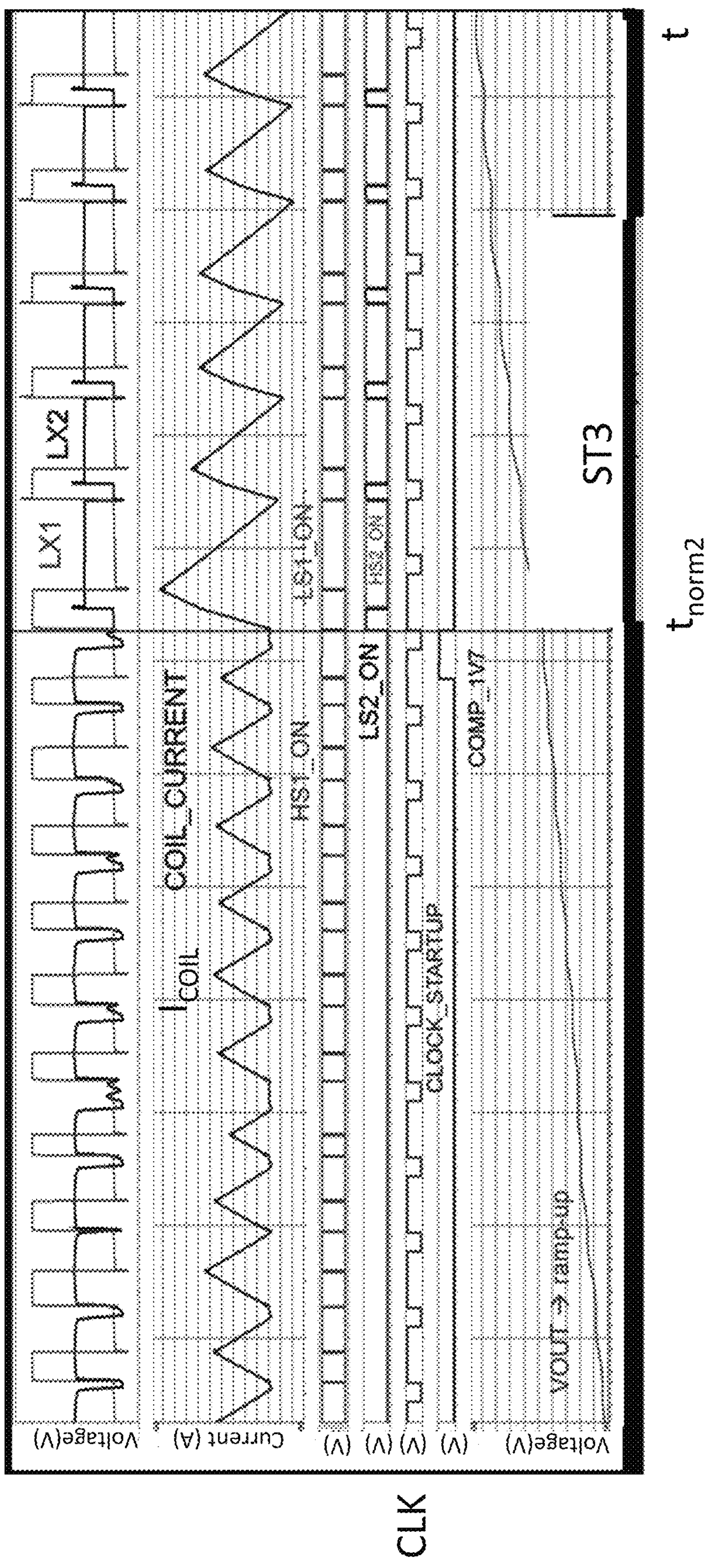
FIG. 17 shows a time diagram, illustrating the operation of the converter in the transition from the startup procedure to the control method.

FIG. 17 shows a time diagram, which illustrates the start-up phase transition (TS23) between asynchronous mode and normal RHCMC operation at time $t_{norm2}$ by showing the voltages on LX1 and LX2, the coil current ICOIL, the comparator output COMP_1V7, the fixed clock CLK, HS1 and LS1 state, HS2 and LS2 state, and VOUT as a function of time.

The waveforms in FIGS. 16 and 17 refer to an exemplary case with VIN=5V and a clock frequency of 1.5 MHz. The signal SENSE is provided by a current sensor on HS1 and can be exploited only to detect the coil peak current (i.e., it determines the HS1_ON duration). A blanking time (MASK time $t_{MSK}$) is typically exploited to allow proper settling of the current sensor output and obtain a reliable signal (not strictly compulsory).

It is important to note that: a clock signal CLK with unbalanced duty-cycle may be exploited to limit the maximum coil charge phase (e.g., 75% duty-cycle clock→75% maximum DC-DC duty-cycle); for this reason the transition in FIG. 15 from ST1 to ST2 contains in logical OR the clock CLK falling edge; for simplicity, here the exploited convention has been to start the switching cycle at the clock CLK rising edge, but the same could be obtained inverting the clock rising edges; and if necessary, the DC-DC converter automatically operates in DCM mode and skips some cycles as well.

Thus summarizing, FIGS. 15-17 present a solution which takes care of the start-up phase of RHCMC converters. The converter 10 performs the start-up in closed loop without losing regulation and remaining within specifications (e.g., no inrush current), no matter PVT variations, operation condition or external components variations (i.e., the system automatically adapt itself).

The implementation does not require any extra voltage supply/rail, nor any extra circuit, but simply makes use of what is already available. To note that in a power management IC a clock signal is typically present for other different purposes, thus clock CLK can be obtained there. The same comparator used for steady-state protection purposes can be easily exploited (e.g., under-voltage-protection, short-circuit-protection) for monitoring the output voltage VOUT during the start-up phase, thus re-using (e.g., multiplexing) a circuit already present on chip.

It is emphasized that the solution described with reference to FIGS. 15-17 can be applied to the NIBB converter described with reference to FIGS. 1-14, however it can be applied to any other DC-DC converter, boost, NIBB or other topologies which is affected by similar problems in the startup phase.

Thus, the solution refers also to a method according to any of the preceding claims, wherein it comprises a startup procedure of, e.g., the NIBB converter 10, comprising:

providing a fixed frequency startup clock CLK to the converter, 10;

at start, transition TS0, bringing the converter, e.g., 10, in a first startup state, ST1, in which only the first high side switch HS1 is asserted, which lasts until said coil current $I_{COIL}$ reaches a peak, signaled by the assertion of a corresponding peak signal, e.g., flag PEAK=1, then a transition, e.g., TS12, to a second state ST2 is performed in which a coil discharge is performed, in particular by asserting only the first low side switch LS1, at the following startup clock CLK rising edge then either going to the first state TS21, if the output voltage VOUT has not reached a given minimum value or to a third state in which said ripple-hysteretic-current-mode-control is performed.

As mentioned, this startup procedure can be applied to the NIBB converter 10 or also to other converters.

From the description here above thus the advantages of the solution described are apparent.

The solution here described allows a NIBB converter to have high efficiency in all input voltage $V_{IN}$ and output voltage $V_{OUT}$ conditions, especially in the critical region where $V_{IN} \ll V_{OUT}$. Such solution maintains a low coil current in all the $V_{IN}$ and $V_{OUT}$ conditions, meeting the optimum limit in the critical region of $V_{IN} \ll V_{OUT}$.

Basically, the solution determines a converter operating in non-inverting buck-boost mode without limitation of output current capability (also when $V_{IN} \ll V_{OUT}$)

This converter allows to minimize the silicon area due to smaller power MOSFETs. At the same time, the DC-DC converter according to the solution here described facilitates the exploitation of small external passive components with relaxed electrical specifications, which is critical in consumer applications.

The proposed solution may always operate in forced CCM without skipping, to minimize the output voltage ripple. Moreover, in a more generalized implementation and to optimize light-load operation, the Discontinuous Conduction Mode (DCM) can be easily implemented and managed: for instance, a standard zero-current-detector comparator may be employed to avoid the coil current to reverse and become negative (in this case the DC-DC converter automatically performs in Pulse-Frequency-Mode).

Also, the solution here described allows to obtain a high performance, free-running non-inverting buck-boost DC-DC converter, with superior transient response and high bandwidth, allowing to suppress fast line-transients, which are critical for instance in AMOLED applications.

The proposed solution in embodiments also properly manages the start-up phase so that it does not impact the normal DC-DC operation and the seamless transition is smooth. In fact, the converter design and control loop is not affected by the solution here described, since the normal operation remains unchanged. Particularly, the need to monitor the valley coil current during the initial start-up phase is bypassed and there is no need for any extra valley current sensor, nor to change its design/architecture.

The solution regarding the start-up procedure may benefit any generic DC-DC topology and is not limited to ripple-hysteretic-current-mode-controlled (RHCMC) converters, but applies to any control scheme relying on the current sensor information not available during start-up. Moreover, the proposed algorithm can be directly embedded within the DC-DC controller/digital core (i.e., HDL code written, synthetized and verified) with a minimum area effort. The impact on the efficiency/quiescent consumption of the whole DC-DC is zero, since the clock is then gated, and the steady-state operation is not affected.

The proposed solution remains fully integrated on-chip and does not require any extra pad/ball, nor additional off-chip component. The solution described does not require any extra process mask or specific devices, and the converter performances are enhanced without sacrificing other specs nor requiring any trimming.

Without prejudice to the underlying principles, the details and embodiments may vary, even significantly, with respect to what has been described by way of example only, without departing from the extent of protection.

The claims are an integral part of the technical disclosure of the embodiments as provided herein.

The extent of protection is defined by the annexed claims.

The invention claimed is:

1. A method for controlling a non-inverting buck boost DC-DC converter that includes: a first input half bridge coupled to an end of an inductive coil and a second output half bridge coupled to an other end of said inductive coil, said first input half bridge comprising a first high side switch coupled between an input node and said end of the inductive coil and a first low side switch coupled between said end of the inductive coil and ground, said second input half bridge comprising a second high side switch coupled between an output node and said other end of the inductive coil and a second low side switch coupled between said other end of the inductive coil and ground, the method comprising:

providing a control voltage based on an error between a feedback signal from said output of said non-inverting buck boost DC-DC converter and a reference signal;

performing a first comparison of said control voltage, adding an offset voltage, with a reference signal that is proportional to a current flowing in said inductive coil, said first comparison detecting the control voltage reaching a peak voltage;

performing a second comparison of said control voltage, subtracting the offset voltage, with a reference signal that is proportional to the current flowing in said inductive coil, said second comparison detecting the control voltage reaching a valley voltage;

generating from results of the first and second comparisons control signals applied to said switches of said non-inverting buck boost DC-DC converter to drive switch opening and closing;

controlling operation of said non-inverting buck boost DC-DC converter with ripple-hysteretic-current-mode-control in a plurality of states of operation including:

a first state in which said control signals cause the first high side switch and the second low side switch to be closed;

a second state in which said control signals cause the first high side switch and the second high side switch to be closed;

a third state in which said control signals cause the first low side switch and the second high side switch to be closed; and a fourth state in which said control signals cause the first low side switch and the second low side switch to be closed;

wherein said controlling comprises:

passing from the first state to the second state when the control voltage is detected reaching the peak voltage;

passing from the second state to the first state when the control voltage is detected reaching the valley voltage;

passing from the second state to the third state upon detection of the expiration of a first time interval, measured from entering the second state, having a length that varies as a function of a set of detection parameters and decreases with increase of said input voltage, said control voltage being detected as having not reached said valley voltage;

passing from the third state to the fourth state when said control voltage is detected reaching said valley voltage and a second time interval, having a fixed length measured from entering said third state, is not expired;

passing from the third state to the first state when the second time interval is expired and the control voltage is detected reaching the valley voltage; and passing from the fourth state to the first state when the second time interval is expired.

2. The method according to claim 1, wherein the length of the first time interval further decreases as a function of a difference between the input voltage and the output voltage.

3. The method according to claim 1, further comprising:

operating said non-inverting buck boost DC-DC converter in buck boost mode when the input voltage is within a determined voltage range of the output voltage;

operating said non-inverting buck boost DC-DC converter in a step up mode when the input voltage is lower than the output voltage outside said determined voltage range; and operating said non-inverting buck boost DC-DC converter in step down mode when the input voltage is greater than the output voltage outside said range.

4. The method according to claim 3, further comprising regulating the passage among the buck boost mode, the step up mode, and the step down mode by selecting values of the set of detection parameters and the fixed length of the second time interval.

5. The method according to claim 3, wherein said step up mode comprises, in a switching cycle of the control signals passing from the first state to the second state when said control voltage reaches said peak voltage, passing from the second state to the first state when said control voltage reaches said valley voltage.

6. The method according to claim 3, wherein said buck boost mode comprises, in a switching cycle of the control signal passing from the first state to the second state when said control voltage reaches said peak voltage:

passing from the second state to the third state upon expiry of the first time interval and said control voltage being detected as having not reached said valley voltage;

passing from the third state to the fourth state when said control voltage is detected reaching said valley voltage and the second time interval is not expired; and passing from the fourth state to the first state if the second time interval is expired.

7. The method according to claim 3, wherein said step down mode comprises, in a switching cycle of the control signal passing from the first state to the second state when said control voltage reaches said peak voltage:

passing from the second state to the third state upon expiry of a first time interval and said control voltage being detected as having not reached said valley voltage; and passing from the third state to the first state if the second time interval is expired and the valley voltage is reached.

8. The method according to claim 1, further comprises performing a startup procedure of said non-inverting buck boost DC-DC converter comprising:

providing a fixed frequency startup clock to the non-inverting buck boost DC-DC converter;

bringing the non-inverting buck boost DC-DC converter to a first startup state in which only the first high side switch is closed, said first startup state lasting until said current flowing in the inductive coil reaches a peak;

then transitioning to a second startup state is performed in which a coil discharge is performed; and then either: a) transitioning to the first startup state at the following startup clock rising edge if the output voltage has not reached a given minimum value, or b) transitioning to a third startup state in which said ripple-hysteretic-current-mode-control is performed.

9. The method according to claim 1, wherein said operating control comprises sending respective signals for starting measuring expiration of the first time interval from entering said second state and expiration of the second time interval measured from the entering said third state.

10. A control circuit of a non-inverting buck boost DC-DC converter configured to perform a ripple-hysteretic-current-mode-control according to claim 1.

11. The control circuit according to claim 10, wherein said control circuit comprises:

a circuit configured to compare said control voltage to a sense voltage to detect reaching a peak value and asserting a corresponding peak flag and detect reaching a valley value and asserting a valley flag;

a first timing circuit configured to detect expiration of a determined time length proportional to a difference between the input voltage and the output voltage and assert a corresponding buck timer flag; and a second timing circuit configured to detect expiration of said second time interval asserting a corresponding minimum timer flag.

12. The control circuit according to claim 11, wherein said circuit configured to compare said control voltage comprises:

a comparator that compares said control voltage with a shifted sense voltage obtained by applying to a shift resistance coupled to an input of the comparator a voltage proportional to the current flowing in said inductive coil;

a circuit configured to inject in a node of the shift resistance a fixed current, an up current proportional to the difference of the output voltage to the input voltage, and a down current proportional to the opposite of said difference of the output voltage to the input voltage;

wherein said sense voltage is applied to the positive input of the comparator to generate said peak flag, and said sense voltage is applied to the negative input of the comparator to generate said valley flag.

13. The control circuit according to claim 11, wherein said control circuit comprises a timer circuit configured to detect said first time interval, said timer circuit comprising:

a capacitor charged by one of: a) a current proportional by a first proportionality factor to the input voltage, or b) a current proportional, by a second proportionality factor to a difference of the input voltage to the output voltage; and a comparator configured to compare a voltage drop on said capacitor to a reference buck time voltage to obtain said timer buck flag value.

14. The control circuit according to claim 13, wherein said set of detection parameters comprises: the value of said capacitor, said reference buck time voltage, said first proportionality factor, and said second proportionality factor.

15. The control circuit according to claim 14, configured to send said respective signals starting said measuring to switches enabling said charging of the capacitor.

16. The control circuit according to claim 11, wherein said control circuit comprises a timer circuit configured to detect said second time interval, said timer circuit comprising:

a capacitor charged by a given fixed current; and a comparator configured to compare a voltage drop on said capacitor to a minimum time reference voltage to obtain said minimum time flag value.

17. The control circuit according to claim 16, configured to send said respective signals starting said measuring to switches enabling said charging of the capacitor.

* * * * *